US012571703B2

(12) United States Patent
Alayadah et al.

(10) Patent No.: US 12,571,703 B2
(45) Date of Patent: Mar. 10, 2026

(54) ABNORMAL OPERATING CONDITION VALIDATION SYSTEM FOR SALTWATER DISPOSAL PUMP SYSTEMS AND METHODS OF USE THEREOF

(71) Applicant: Saudi Arabian Oil Company, Dhahran (SA)

(72) Inventors: Ziyad Hamad Alayadah, Dhahran (SA); Mohamad Rizal Mohamad Yatim, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 441 days.

(21) Appl. No.: 18/358,421

(22) Filed: Jul. 25, 2023

(65) Prior Publication Data

US 2025/0035511 A1     Jan. 30, 2025

(51) Int. Cl.
*G01M 13/00* (2019.01)
*G08B 21/18* (2006.01)

(52) U.S. Cl.
CPC ........... *G01M 13/00* (2013.01); *G08B 21/182* (2013.01); *G08B 21/187* (2013.01)

(58) Field of Classification Search
None
See application file for complete search history.

(56) References Cited

U.S. PATENT DOCUMENTS

| | | | |
|---|---|---|---|
| 8,484,511 B2 | 7/2013 | Tidwell et al. | |
| 10,451,075 B1 * | 10/2019 | Mann | E21B 43/40 |
| 12,196,060 B2 * | 1/2025 | Murtaza | G05B 13/04 |

* cited by examiner

*Primary Examiner* — Matthew G Marini
(74) *Attorney, Agent, or Firm* — DINSMORE & SHOHL LLP

(57)     ABSTRACT

Embodiments of the present disclosure are directed to a system for monitoring operating conditions of a saltwater disposal pump system, which includes a processing device that causes a controller to receive an alarm from the at least one machine that exceeds a predetermined alarm level indicative of an abnormal machine operation, receive a plurality of data from a plurality of sensors that are indicative of a current operating conditions of a saltwater disposal pump assembly, derive an expected value utilizing a statistical regression analysis, determine whether the expected value and a history of the plurality of data correlate at a point where the plurality of data exceeds the predetermined alarm level, determine whether a deviation from a predefined operating profile exceeds a predetermined machine data validation threshold value, validate the alarm, output an alert of the deviation and inhibit further operation of the saltwater disposal pump assembly.

20 Claims, 12 Drawing Sheets

MEMORY DEVICE 212

| OPERATING LOGIC 230 | DISPLAY LOGIC 232 | ALERT LOGIC 234 | VALIDATION LOGIC 236 | SWITCHOVER LOGIC 238 | CURRENT LOGIC OPERATING CONDITIONS 240 |

DATA STORAGE DEVICE 216

| DISPLAY DATA 250 | ALERT DATA 252 | REGRESSION FORMULA DATA 254 | SWITCHOVER DATA 256 | PREDEFINED OPERATING PROFILE DATA 258 | PREDETERMINED ALARM DATA 260 | EVENTS DATA 262 | HISTORY DATA 264 | MODEL DATA 266 | PLURALITY OF SENSOR DATA 268 |

900

602a

Oil Train #1 Equipment Switchover Compliance

| Asset | Availability | Status | Switchover Frequency | Last Startup Time | Idle Condition Period | Switchover Compliance |
|-------|-------------|--------|---------------------|-------------------|----------------------|----------------------|
| G-0201A | Available | Running | 30 days | 8/16/2020 4:17:25 PM | 0.0010069 d | Complying |
| G-0201B | Available | Running | 30 days | 8/16/2020 4:17:25 PM | 0.0010069 d | Complying |
| G-0201C | Available | Stopped | 30 days | 8/16/2020 4:17:25 PM | 0.0010069 d | Complying |
| G-0202A | Available | Stopped | 30 days | 8/16/2020 4:17:25 PM | 0.0010069 d | Complying |
| G-0202B | Available | Running | 30 days | 8/16/2020 4:17:25 PM | 0.0010069 d | Complying |
| G-0202C | S/B Mode | Running | 30 days | 8/16/2020 4:17:25 PM | 0.0010069 d | Complying |
| G-0204A | Available | Running | 30 days | 8/16/2020 4:17:25 PM | 0.0010069 d | Complying |
| G-0204B | S/B Mode | Running | 30 days | 8/16/2020 4:17:25 PM | 0.0010069 d | Complying |
| G-0204C | Not Available | Stopped | 30 days | 10/14/2019 4:49:00 PM | 306.98 d | Complying |
| G-0206A | Available | Running | 30 days | 8/16/2020 4:17:25 PM | 0.0010069 d | Complying |
| G-0206B | Available | Running | 30 days | 8/16/2020 4:17:25 PM | 0.0010069 d | Complying |
| G-0206C | Available | Running | 30 days | 8/16/2020 4:17:25 PM | 0.0010069 d | Complying |
| G-0214A | Available | Stopped | 30 days | 8/16/2020 4:17:25 PM | 0.0010069 d | Complying |
| G-0214B | Available | Running | 30 days | 8/16/2020 4:17:25 PM | 0.0010069 d | Complying |
| G-0214C | Not Available | Stopped | 30 days | 5/27/2020 9:43:30 AM | 81.275 d | Complying |

902   904   906   908   910   912   914

Note: If equipment is not available, then it is not violating the switchover strategy

FIG. 9

Main Page

Event Tracking Dashboard

| Event Name | Asset | Asset Path | Start Time | End Time | Severity | Duration | Acknowledgement |
|---|---|---|---|---|---|---|---|
| Prediction Analysis 2020-... | G-0214C | DHA00730-ESCP13Kh... | 8/16/2020 4:05:20 PM | In Progress | Warning | 11m 41s | Acknowledge |
| Prediction Analysis 2020-... | G-0214C | DHA00730-ESCP13Kh... | 8/16/2020 4:05:20 PM | In Progress | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Suction Sir DP 2020-08-... | G-0214B | DHA00730-ESCP13Kh... | 8/16/2020 3:37:10 PM | 8/16/2020 4:01:40 PM | Major | 24m 29s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |
| Suction Sir DP 2020-16-... | G-0214B | DHA00730-ESCP13Kh... | 8/16/2020 1:06:40 PM | 8/16/2020 2:28:55 PM | Major | 1h 20m | Acknowledge |
| Prediction Analysis 2020-... | G-0214C | DHA00730-ESCP13Kh... | 8/16/2020 4:05:20 PM | 8/16/2020 4:02:35 PM | Warning | 11m 41s | Acknowledge |

FIG. 10

ABNORMAL OPERATING CONDITION VALIDATION SYSTEM FOR SALTWATER DISPOSAL PUMP SYSTEMS AND METHODS OF USE THEREOF

TECHNICAL FIELD

The present disclosure generally relates to operating condition monitoring of saltwater disposal pump systems and, more particularly, to systems and methods for validating abnormal operating conditions of saltwater disposal pumps within saltwater disposal pump systems.

BACKGROUND

Current monitoring of machine operations and performance uses various sensors that output data indicative of the machine operation. However, many times, the data may not be accurate or small abnormalities go unnoticed until a larger failure occurs. In either case, false alarms or other undesirable, time consuming and costly events are prevalent when the data is not reliable. As such, a need exists that correlates machine data to determine whether a machine is, or will fail, eliminating false alarms and predicting future machine performance.

SUMMARY

In one embodiment, a saltwater disposal pump system is provided. The saltwater disposal pump system includes a saltwater disposal pump assembly, a saltwater disposal pump transmitter, and an abnormal operating conditions validation unit. The saltwater disposal pump assembly includes an inlet valve, a saltwater tank, at least one pipe, an outlet valve, a recycle valve assembly, a pump, and a plurality of sensors. The saltwater tank is fluidly coupled to the inlet valve. The saltwater tank is configured to retain a saltwater. The at least one pipe is fluidly coupled to the saltwater tank. The outlet valve is fluidly coupled to a portion of the at least one pipe. The recycle valve assembly is fluidly coupled to the at least one pipe. The pump has a motor and is fluidly coupled to the at least one pipe and the recycle valve assembly. The pump is configured to generate a pressure within the at least one pipe such that the saltwater retained in the saltwater tank is forced through the pump and into a well site under pressure. The plurality of sensors are configured to sense a plurality of data. The plurality of data includes a suction strainer differential pressure, a suction flow, a discharge pressure, a suction pressure, a vibration, and a temperature. The saltwater disposal pump transmitter is configured to output the plurality of data. The abnormal operating conditions validation unit is communicatively coupled to the saltwater disposal pump assembly via an abnormal operating conditions validation unit receiver that is communicatively coupled to the saltwater disposal pump transmitter. The abnormal operating conditions validation unit includes an operational fluid disposal data output translation module, an operational fluid disposal data processing module, and an operational disposal data memory. The operational disposal data memory includes at least one instruction that, when executed by the operational fluid disposal data processing module, causes the operational fluid disposal data processing module to receive an alarm from the saltwater disposal pump assembly that exceeds a predetermined alarm level indicative of an abnormal machine operation, receive the plurality of data from the plurality of sensors that is indicative of a current operating conditions of the saltwater disposal pump assembly, derive an expected value for the plurality of data utilizing a statistical regression analysis, wherein the statistical regression analysis comprises at least one statistical regression formula, the at least one statistical regression formula comprises the plurality of data from the suction strainer differential pressure, the suction flow, the discharge pressure, the suction pressure, the vibration, and the temperature as variables for the statistical regression analysis, determine whether the expected value and a history of the plurality of data correlate at a point where the plurality of data exceeds the predetermined alarm level indicative of the abnormal machine operation, in response to determining that the expected value and the history of the plurality of data correlate at the point where the plurality of data exceeds the predetermined alarm level indicative of the abnormal machine operation, determine whether a deviation from a predefined operating profile exceeds a predetermined machine data validation threshold value, in response to determining that the deviation from the predefined operating profile exceeds the predetermined machine data validation threshold value, validate the alarm, output an alert of the deviation and inhibit further operation of the saltwater disposal pump assembly.

In another embodiment, a method for validating abnormal operating conditions of a saltwater disposal pump system is provided. The method includes the steps of receiving an alarm from a saltwater disposal pump assembly that exceeds a predetermined alarm level indicative of an abnormal machine operation. The saltwater disposal pump assembly including an inlet valve, a saltwater tank fluidly coupled to the inlet valve, the saltwater tank configured to retain a saltwater, at least one pipe fluidly coupled to the saltwater tank, an outlet valve fluidly coupled to a portion of the at least one pipe, a recycle valve assembly fluidly coupled to the at least one pipe, a pump having a motor and fluidly coupled to the at least one pipe and the recycle valve assembly, the pump configured to generate a pressure within the at least one pipe such that the saltwater retained in the saltwater tank is forced through the pump and into a well site under pressure, and a plurality of sensors configured to sense a plurality of data, the plurality of data includes a suction strainer differential pressure, a suction flow, a discharge pressure, a suction pressure, a vibration, and a temperature. The method continues by receiving the plurality of data from the plurality of sensors indicative of a current operating conditions of the saltwater disposal pump assembly, deriving an expected value for the plurality of data utilizing a statistical regression analysis, wherein the statistical regression analysis comprises at least one statistical regression formula, the at least one statistical regression formula comprises the plurality of data from the suction strainer differential pressure, the suction flow, the discharge pressure, the suction pressure, the vibration, and the temperature as variables for the statistical regression analysis, determining whether the expected value and a history of the plurality of data correlate at a point where the plurality of data exceeds the predetermined alarm level indicative of the abnormal machine operation, in response to determining that the expected value and the history of the plurality of data correlate at the point where the plurality of data exceeds the predetermined alarm level indicative of the abnormal machine operation, determining whether a deviation from a predefined operating profile exceeds a predetermined machine data validation threshold value, in response to determining that the deviation from the predefined operating profile exceeds the predetermined machine data validation threshold value, validating the alarm received from the saltwater disposal pump assembly indicative of the abnormal machine operation, outputting an alert of the deviation and inhibiting a further operation of the saltwater disposal pump assembly.

In yet another embodiment, a saltwater disposal pump system configured to validate an abnormal machine operating condition is provided. The saltwater disposal pump system includes a first saltwater disposal pump assembly, a second saltwater disposal pump assembly, a saltwater disposal pump transmitter, and an abnormal operating conditions validation unit. The first saltwater disposal pump assembly includes a first inlet valve, a first saltwater tank, at least one first pipe, a first outlet valve, a first recycle valve assembly, a first pump, and a first plurality of sensors. The first saltwater tank is fluidly coupled to the first inlet valve. The first saltwater tank is configured to retain a saltwater. The at least one first pipe is fluidly coupled to the first saltwater tank. The first outlet valve is fluidly coupled to a portion of the at least one first pipe. The first recycle valve assembly is fluidly coupled to the at least one first pipe. The first pump has a first motor and is fluidly coupled to the at least one first pipe and the first recycle valve assembly. The first pump is configured to generate a pressure within the at least one first pipe such that the saltwater retained in the first saltwater tank is forced through the first pump and into a well site under pressure. The first plurality of sensors are configured to sense a first plurality of data. The first plurality of data includes a suction strainer differential pressure, a suction flow, a discharge pressure, a suction pressure, a vibration, and a temperature. The second saltwater disposal pump assembly includes a second inlet valve, a second saltwater tank, at least one second pipe, a second outlet valve, a second recycle valve assembly, a second pump, and a second plurality of sensors. The second saltwater tank is fluidly coupled to the second inlet valve. The second saltwater tank is configured to retain a saltwater. The at least one second pipe is fluidly coupled to the second saltwater tank. The second outlet valve is fluidly coupled to a portion of the at least one second pipe. The second recycle valve assembly is fluidly coupled to the at least one second pipe. The second pump has a second motor and is fluidly coupled to the at least one second pipe and the second recycle valve assembly. The second pump is configured to generate a pressure within the at least one second pipe such that the saltwater retained in the second saltwater tank is forced through the second pump and into a well site under pressure. The second plurality of sensors are configured to sense a second plurality of data. The second plurality of data includes a suction strainer differential pressure, a suction flow, a discharge pressure, a suction pressure, a vibration, and a temperature. The saltwater disposal pump transmitter is configured to output the plurality of data and the second plurality of data. The abnormal operating conditions validation unit communicatively coupled to the first saltwater disposal pump assembly and the second saltwater disposal pump assembly via an abnormal operating conditions validation unit receiver that is communicatively coupled to the saltwater disposal pump transmitter. The abnormal operating conditions validation unit includes an operational fluid disposal data output translation module, an operational fluid disposal data processing module, and an operational disposal data memory. The operational disposal data memory includes at least one instruction that, when executed by the operational fluid disposal data processing module, causes the operational fluid disposal data processing module to receive an alarm from the first saltwater disposal pump assembly that exceeds a predetermined alarm level indicative of an abnormal machine operation, receive the first plurality of data from the first plurality of sensors indicative of a current operating conditions of the first saltwater disposal pump assembly, derive an expected value for the first plurality of data utilizing a statistical regression analysis, wherein the statistical regression analysis comprises at least one statistical regression formula, the at least one statistical regression formula that comprises the first plurality of data from the suction strainer differential pressure, the suction flow, the discharge pressure, the suction pressure, the vibration, and the temperature as variables for the statistical regression analysis, compare the expected value with a history of the first plurality of data from the first plurality of sensors, determine whether the expected value and the history of the first plurality of data correlate at a point where the first plurality of data exceeds the predetermined alarm level indicative of the abnormal machine operation, in response to determining that the expected value and the history of the plurality of data correlate at the point where the first plurality of data exceeds the predetermined alarm level indicative of the abnormal machine operation, determine whether a deviation from a predefined operating profile exceeds a predetermined machine data validation threshold value, in response to determining that the deviation from the predefined operating profile exceeds the predetermined machine data validation threshold value, validate the alarm received from the first saltwater disposal pump assembly, output an alert of the deviation, inhibit further operation of the first saltwater disposal pump assembly, and perform an automatic switchover from the first saltwater disposal pump assembly that is determined to have the abnormal machine operation to the second saltwater disposal pump assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 9 schematically depicts an illustrative graphical user interface dashboard for machine switchover compliance, according to one or more embodiments shown and described herein; and FIG. 10 schematically depicts an illustrative graphical user interface dashboard for event tracking, according to one or more embodiments shown and described herein.

DETAILED DESCRIPTION

Embodiments of the present disclosure are directed to improved systems and methods to monitor and identify when rotating equipment, such as oil trains, saltwater disposal pumps, and/or other machine types that need maintenance and thus should not be operating. More specifically, the disclosed systems and methods provide embodiments to monitor actual conditions of the rotating equipment to validate an alert of an abnormal operating condition generated by either an instrument module communicatively coupled to the rotating equipment and/or generated from an electronic computing device. The validation is performed by deriving an expected value for a plurality of data provided from a plurality of sensors by utilizing a statistical regression analysis. The statistical regression analysis includes at least one statistical regression formula that includes as variables data gathered from the plurality of sensors such as a suction strainer differential pressure, a suction flow, a discharge pressure, a suction pressure, and a temperature. When the alert of the abnormal operating condition generated by the instrument module indicative of the current operating conditions of the rotating equipment is validated, an alert is output to notify a user of the deviation and to inhibit further operation of the particular rotating equipment and to perform an automatic switchover from the particular rotating equipment that is determined to have the abnormal machine operation to a different rotating equipment that is operating normally.

As such, the various components described herein may be used to carry out one or more processes to improve accuracy of determining undesirable conditions of the rotating equipment and/or machines and to eliminate the need for human monitoring or prediction using machine learning process to passively improve the accuracy of condition monitoring.

Various systems and methods for monitoring rotating equipment and/or machines are described in detail herein.

The phrase "communicatively coupled" is used herein to describe the interconnectivity of various components of the illustrative operating conditions validating system means that the components are connected either through wires, optical fibers, or wirelessly such that electrical, optical, data, and/or electromagnetic signals may be exchanged between the components. It should be understood that other mechanisms of connecting the various components of the system not specifically described herein are included without departing from the scope of the present disclosure.

Figure 1A:
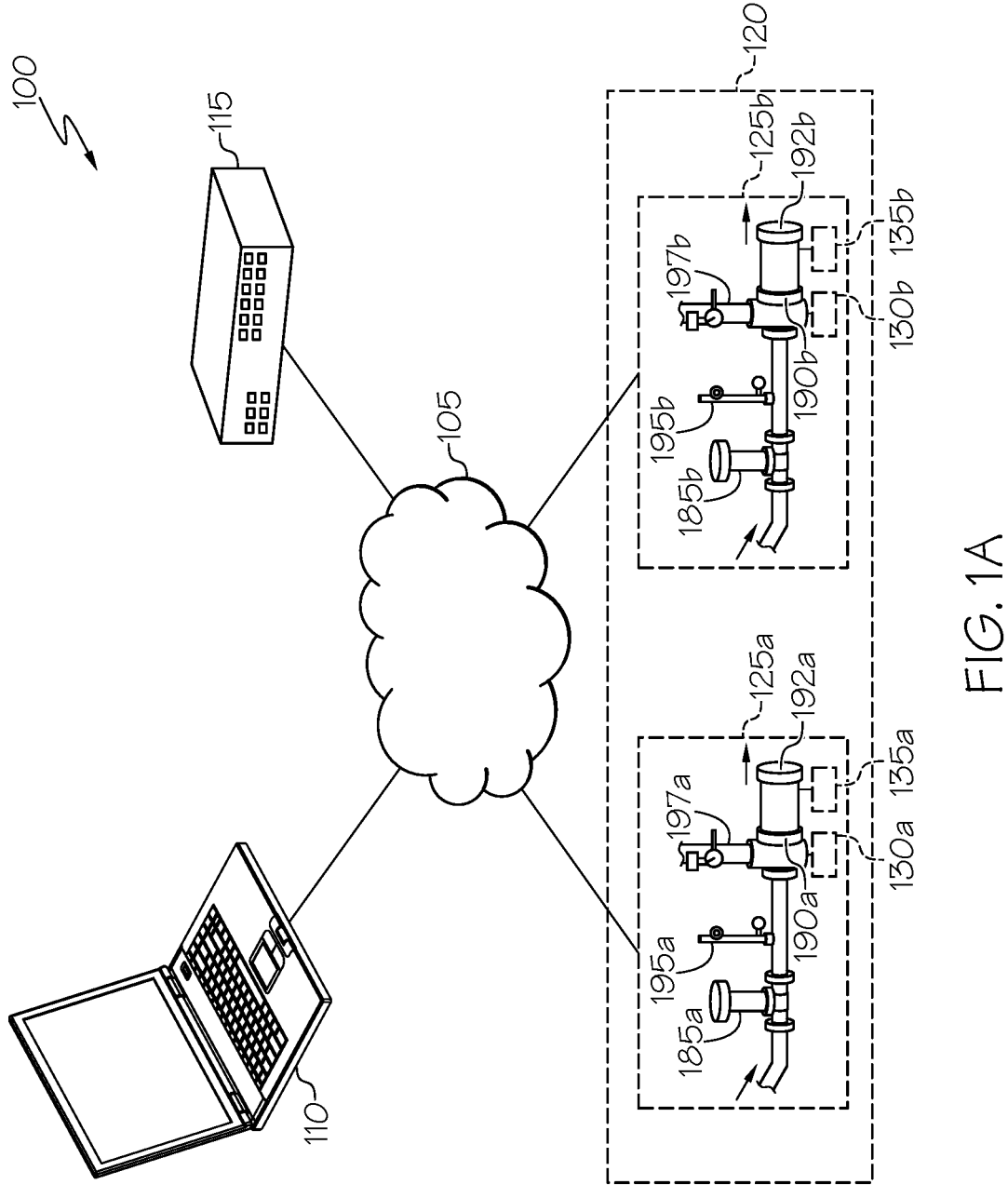
FIG. 1A schematically depicts an illustrative operating conditions validating system for monitoring operating conditions of a machine system, according to one or more embodiments described and illustrated herein.
Figure 1B:
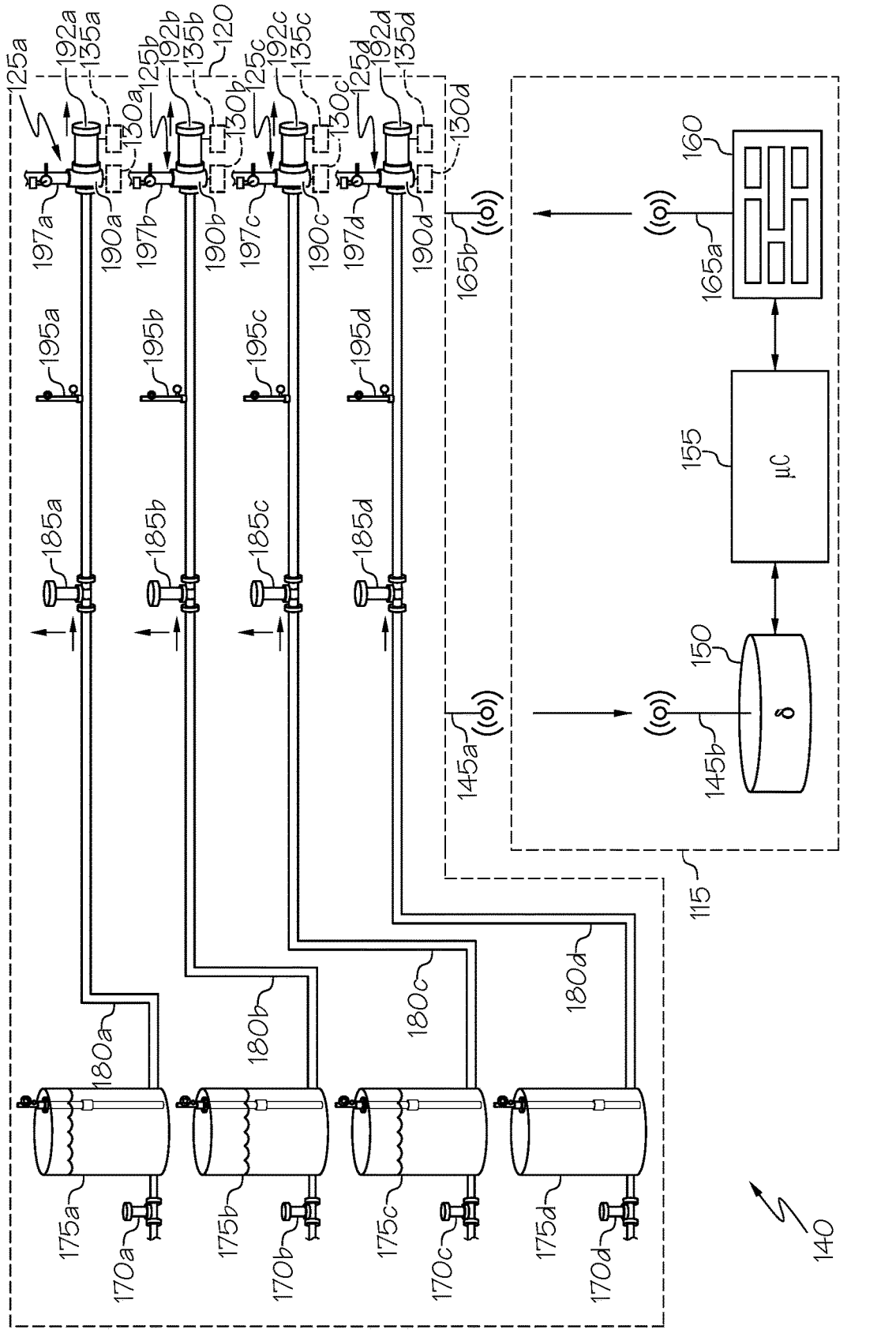
FIG. 1B schematically depicts other hardware for an operating conditions validating system that provides input data and implementing results of the operating conditions validating, according to one or more embodiments described and illustrated herein.

Referring now to the drawings, FIGS. 1A-1B depicts example components of an illustrative operating conditions validating system 100 configured to monitor operating conditions of a plurality of saltwater disposal pump assemblies 125a, 125b, 125c, 125d within a saltwater disposal pump system 120 according to embodiments shown and described herein. That is, the saltwater disposal pump system 120 may be a system that includes more than one of the saltwater disposal pump assemblies 125a, 125b, 125c, 125d which are monitored and any abnormalities in machine operations are validated by the illustrative operating conditions validating system 100. Each of the saltwater disposal pump assemblies 125a, 125b, 125c, 125d may include, without limitation, an inlet valve 170a, 170b, 170c, 170d, a saltwater tank 175a, 175b, 175c, 175d, saltwater transfer piping 180a, 180b, 180c, 180d, outlet valves 185a, 185b, 185c, 185d, compressors or pumps 190a, 190b, 190c, 190d, recycle valve assemblies, 195a, 195b, 195c, 195d, and saltwater output piping 197a, 197b, 197c, 197d, respectively. Further, the saltwater disposal pump system 120 may include more or fewer of the saltwater disposal pump assemblies 125a, 125b, 125c, 125d than in the depicted embodiments.

It should be understood that the saltwater disposal pump system 120 may include the various components discussed above, and/or other components to hold, transfer, and/or move saltwater through positive or negative pressure as needed in the process of oil and gas production. For example, since saltwater may be considered hazardous, the saltwater that is extracted is collected in tanks and then pumped back into a ground into a disposal well as an approved well site.

Each of the inlet valves 170a, 170b, 170c, 170d may be abrasion resistant valves, disc valves, gate valves, ball valves, spring assisted valves, diaphragm valves, needle valves, weight-operated dump valves, and/or the like, that may be manually controlled, pneumatically controlled, hydraulically controlled, electromagnetic controlled, combinations thereof, and/or the like. Each of the saltwater tanks 175a, 175b, 175c, 175d may be any container capable of storing saltwater such as metals, rubbers, silicon, composites, and the like, and are fluidly coupled to the inlet valves 170a, 170b, 170c, 170d and the saltwater transfer piping 180a, 180b, 180c, 180d, respectively. The saltwater transfer piping 180a, 180b, 180c, 180d may be any pipe or container capable of storing, transporting, and moving saltwater, such as, without limitation, piping made from metals, rubbers, silicon, composites, and the like. The saltwater transfer piping 180a, 180b, 180c, 180d may also be fluidly coupled to the pumps 190a, 190b, 190c, 190d, respectively and the outlet valves 185a, 185b, 185c, 185d, may be fluidly coupled to the saltwater transfer piping 180a, 180b, 180c, 180d and positioned between the saltwater tanks 175a, 175b, 175c, 175d and the pumps 190a, 190b, 190c, 190d, respectively. Each of the outlet valves 185a, 185b, 185c, 185d may be abrasion resistant valves, disc valves, gate valves, ball valves, spring assisted valves, diaphragm valves, needle valves, weight-operated dump valves, and/or the like, that may be manually controlled, pneumatically controlled, hydraulically controlled, electromagnetic controlled, combinations thereof, and/or the like.

Each of the pumps 190a, 190b, 190c, 190d, may be configured to transfer, and/or move through positive (e.g., 500-2,000 psi or more) or negative pressure. Further, each of the pumps 190a, 190b, 190c, 190d include motors 192a, 192b, 192c, 192d that are configured to meet pressure and flow requirements for the application and are chemically compatible with the produced water to prevent corrosion. Generally, the pumps 190a, 190b, 190c, 190d may be positioned in pump houses some distance away from the saltwater tanks 175a, 175b, 175c, 175d, respectively, and the well site and are configured to generate a pressure to move or transport the saltwater through the saltwater disposal pump system 120. Each saltwater output piping 197a, 197b, 197c, 197d is fluidly coupled to the pumps 190a, 190b, 190c, 190d, respectively, and is configured to transport the saltwater to the well site. The saltwater output piping 197a, 197b, 197c, 197d may be any pipe or container capable of storing, transporting, and moving saltwater, such as, without limitation, piping made from metals, rubbers, silicon, composites, and the like. Each of the recycle valve assemblies, 195a, 195b, 195c, 195d, may be configured to recycle gas flow from the compressor discharge to the suction and prevent operation below a surge point. As such, the recycle valve assemblies, 195a, 195b, 195c, 195d, may include various components, including, without limitation, piston, actuator, pipe, housing, and the like, as appreciated by those having skill in the art.

Now referring back to FIG. 1A, the illustrative operating conditions validating system 100 may generally be configured to communicatively couple one or more computing devices and/or components thereof to the machines within the saltwater disposal pump system 120. Further, the illustrative operating conditions validating system 100 includes, without limitation, a computer network 105, an electronic computing device 110 and an abnormal operating conditions validation unit 115. Further, it should be appreciated that these devices may be local to the saltwater disposal pump system 120, may be remote from the saltwater disposal pump system 120, and/or combinations thereof.

The computer network 105 may include a wide area network (WAN), such as the internet, a mobile communications network, a metropolitan area network (MAN), and/or a public service telephone network (PSTN), a local area network (LAN), a personal area network (PAN), a virtual private network (VPN), and/or other network. Some components of the computer network 105 may be wireless and/or wired to one another (e.g., each of the plurality of saltwater disposal pump assemblies 125a, 125b, 125c, 125d and/or the abnormal operating conditions validation unit 115) techniques known to those skilled in the art.

The electronic computing device 110 may generally provide an interface between a user and the other components connected to the illustrative operating conditions validating system 100. In some embodiments, the electronic computing device 110 may be a user-facing device, such as any personal electronic device. For example, the electronic computing device 110 may be configured as a laptop, mobile phone, tablet, desktop computer, and/or the like, that is positioned to be communicatively coupled to each of the saltwater disposal pump assemblies 125a, 125b, 125c, 125d and may be positioned at or remote from the abnormal operating conditions validation unit 115. As such, the electronic computing device 110 may be positioned at or remote from each of saltwater disposal pump assemblies 125a, 125b, 125c, 125d. In some embodiments, each of the saltwater disposal pump assemblies 125a, 125b, 125c, 125d include a plurality of sensors 130a, 130b, 130c, 130d and each include an instrument module 135a, 135b, 135c, 135d, respectively, that is communicatively coupled to the plurality of sensors 130a, 130b, 130c, 130d, respectively, and to the electronic computing device 110. In some embodiments, either of the instrument modules 135a, 135b, 135c, 135d, and/or the electronic computing device 110 may be configured, based on predetermined thresholds, to output an alert via a user interface and/or provide notification to draw attention to a user, indicative of an abnormal operating condition. In some embodiments, the electronic computing device 110 may be referred to as an instrument module (e.g., the electronic computing device 110 may be used in addition to either the instrument modules 135a, 135b, 135c, 135d, the electronic computing device 110 may replace the instrument modules 135a, 135b, 135c, 135d, or the like) configured to receive data and, based on predetermined thresholds, output an alert via a user interface or other methods to draw attention to a user, indicative of the abnormal operating condition. The electronic computing device 110 may be configured to visually depict the current operating conditions of the saltwater disposal pump assemblies 125a, 125b, 125c, 125d using programmed graphical user interface dashboards, such as those referred to herein with respect to FIGS. 6-10.

As such, the electronic computing device 110 may be used to perform one or more user-facing functions, such as receiving one or more inputs or data from the saltwater disposal pump system 120 (e.g., data from the instrument module 135a, 135b, 135c, 135d of the saltwater disposal pump assemblies 125a, 125b, 125c, 125d respectively, and/or from the plurality of sensors 130a, 130b, 130c, 130d of the saltwater disposal pump assemblies 125a, 125b, 125c, 125d regarding the current operating conditions, and/or the like) as discussed in greater detail herein. Further, the electronic computing device 110 may present a user with a graphical user interface dashboard that provides data, permits the user to interact with the data, sets predetermined thresholds and adjusts as necessary, and/or the like, as discussed in greater detail herein. As such, the electronic computing device 110 may be configured to generate data, store data, index data, search data, provide data, display data, and output data to the abnormal operating conditions validation unit 115 as discussed in greater detail herein.

In some embodiments, the electronic computing device 110 and/or the instrument modules 135a, 135b, 135c, 135d, respectively, may receive data from the each of the respective plurality of sensors 130a, 130b, 130c, 130d of the saltwater disposal pump assemblies 125a, 125b, 125c, 125d respectively, indicative of the current operating conditions of the saltwater disposal pump assemblies 125a, 125b, 125c, 125d. The received data may be raw sensor data and/or may be converted by the instrument modules 135a, 135b, 135c, 135d, respectively, into a different signal data. The received data may be compared with predetermined threshold levels for each of the sensed data streams from the plurality of sensors 130a, 130b, 130c, 130d, respectively, to determine whether an abnormal operating condition is occurring. Example threshold levels for each of the sensed data streams from each of the plurality of sensors 130a, 130b, 130c, 130d may be a pre-alarm level, an alarm level, and a trip level. The pre-alarm level may be set to indicate a predictive failure of a component of the sensed components. The alarm level may be set to indicate when there is an impending failure of the component of the sensed components. The trip level may be set to indicate when there is an actual failure of the component of the sensed components.

In some embodiments, the electronic computing device 110 may be further configured to provide desired oversight, updating, and/or correction to the abnormal operating conditions validation unit 115. The electronic computing device 110 may also be used to connect additional machines, controllers, servers, and/or the like, to the network 105.

The plurality of sensors 130a, 130b, 130c, 130d are each configured to sense specific machine metrics indicative of the current operating conditions for each of the saltwater disposal pump assemblies 125a, 125b, 125c, 125d respectively. As such, each of the saltwater disposal pump assemblies 125a, 125b, 125c, 125d may be communicatively coupled via each of the respective instrument modules 135a, 135b, 135c, 135d to the electronic computing device 110 via the network 105, as discussed herein. Each of the plurality of sensors 130a, 130b, 130c, 130d may be configured to transmit sensed data to the instrument module 135a, 135b, 135c, 135d that receives data and, transits such data, either in raw signal data form or in a converted form, to the electronic computing device 110 that, based on predetermined thresholds, outputs an alert via a user interface dashboard or other methods to draw attention to a user, indicative of an abnormal operating condition of the respective saltwater disposal pump assemblies 125a, 125b, 125c, 125d as discussed in greater detail herein. Example data sensed by each of the plurality of sensors 130a, 130b, 130c, 130d includes, without limitation, a suction strainer differential pressure, a suction flow, a discharge pressure, a suction pressure, vibrations, and/or a temperature for each of the saltwater disposal pump assemblies 125a, 125b, 125c, 125d.

As such, each of the saltwater disposal pump assemblies 125a, 125b, 125c, 125d in the saltwater disposal pump system 120 includes the plurality of sensors 130a, 130b, 130c, 130d, respectively, and the plurality of sensors 130a, 130b, 130c, 130d may include various different sensors, such as, without limitation, BS&W meters or basic sediment and water meters, Linear Variable Differential Transformer (LVDT) displacement transducers, optical displacement sensors, imaging sensors, infrared sensors, moisture probes, gas analyzers such as sensors configured to detect hydrogen sulfide gases, flow meters, pressure sensors, accelerometers configured to detect vibration, proximately sensors configured to detect vibration, temperature sensors, and/or the like. Each of the plurality of sensors 130a, 130b, 130c, 130d may be communicatively coupled to the corresponding instrument module 135a, 135b, 135c, 135d, respectively and/or to the electronic computing device 110 such as via any wireless communication protocol (e.g., Bluetooth, cellular, or similar technology), wired communication protocol (e.g., Ethernet, DeviceNet, CAN, and/or the like) to transmit data gathered by each of the plurality of sensors 130a, 130b, 130c, 130d. It should be understood that each of the saltwater disposal pump assemblies 125a, 125b, 125c, 125d in the saltwater disposal pump system 120 may include more sensors and/or sense additional information/data indicative of the machine performance, but as discussed in greater detail herein, the plurality of sensors 130a, 130b, 130c, 130d sense data that has been predetermined as best correlating the expected value with the historical data when using the regression formula to validate the data. As such, the best correlated data sensed by each of the plurality of sensors 130a, 130b, 130c, 130d includes, without limitation, the suction strainer differential pressure, the suction flow, the discharge pressure, the suction pressure, vibrations, and the temperature.

The abnormal operating conditions validation unit 115 may receive data from one or more sources (e.g., from each of the plurality of sensors 130a, 130b, 130c, 130d, the instrument modules 135a, 135b, 135c, 135d, the electronic computing device 110, and/or the like), to generate data, store data, index data, search data, and/or provide data to other components of the illustrative operating conditions validating system 100 (e.g., the electronic computing device 110 (or components thereof)). In some embodiments, the abnormal operating conditions validation unit 115 may employ one or more algorithms that are used for the purposes of validating data received from the instrument modules 135a, 135b, 135c, 135d, the electronic computing device 110, and/or the like, to validate any undesirable operating conditions of each of the saltwater disposal pump assemblies 125a, 125b, 125c, 125d of the saltwater disposal pump system 120, respectively.

For example, the abnormal operating conditions validation unit 115 may be configured to receive a plurality of data from each of the plurality of sensors 130a, 130b, 130c. 130d, indicative of the current operating conditions of the saltwater disposal pump assemblies 125a, 125b, 125c, 125d respectively. The plurality of data from each of the plurality of sensors 130a, 130b, 130c, 130d may include, without limitation, at least a suction strainer differential pressure, a suction flow, a discharge pressure, a suction pressure, a vibration, and a temperature. The abnormal operating conditions validation unit 115 may be configured to derive an expected value for the plurality of data utilizing a statistical regression analysis. The statistical regression analysis may include at least one statistical regression formula that includes as variables the data from the suction strainer differential pressure, the suction flow, the discharge pressure, the suction pressure, the vibration, and the temperature, as sensed by each of the plurality of sensors 130a, 130b, 130c, 130d.

The abnormal operating conditions validation unit 115 may be configured to compare the expected value with a history of the plurality of data independently from each of the plurality of sensors 130a, 130b, 130c, 130d for each of the saltwater disposal pump assemblies 125a, 125b, 125c, 125d respectively, and independently determines whether there is a correlation between the trend of the expected value and the current sensor data for each of the saltwater disposal pump assemblies 125a, 125b, 125c, 125d as discussed in greater detail herein. Such a correlation confirms that each of the saltwater disposal pump assemblies 125a, 125b, 125c, 125d are independently performing in an abnormal operating condition.

For example, in a non-limiting explanation, the saltwater disposal pump assembly 125a will be used. It should be understood that the below evaluation is simultaneously performed independently on each of the remaining machines in the saltwater disposal pump system 120 (e.g., the saltwater disposal pump assemblies 125b, 125c, 125d). When there is a correlation (e.g., the saltwater disposal pump assembly 125a is performing abnormal based on the sensed data from the plurality of sensors 130a), then the abnormal operating conditions validation unit 115 determines whether there is a deviation in a predefined operating profile for each of the variables. When the deviation is determined, then the abnormal operating conditions validation unit 115 may be configured to determine whether the deviation in the predefined operating profile for each of the variables exceeds a predetermined threshold value. When the deviation does exceed the predetermined threshold value, then the alarm received from the instrument module 135a of the saltwater disposal pump assembly 125a indicative of the abnormal machine operation with the deviation in the predefined operating profile for each of the variables that exceeds the predetermined threshold value is validated by the abnormal operating conditions validation unit 115. Once validated, the abnormal operating conditions validation unit 115 may then be configured to output an alert to notify a user or technician remote from the machine of the deviation and to inhibit further operation of the saltwater disposal pump assembly 125a. Further, the abnormal operating conditions validation unit 115 may be configured to perform an automatic switchover to another or different saltwater disposal pump assembly such as the saltwater disposal pump assembly 125b, 125c, 125d, which is currently functioning properly or with normal operating conditions.

The variable input into the statistical regression formula is analyzed by a machine learning process or algorithm that precisely and continuously classifies each of the variable into a pre-established or predetermined model that was developed by pre-determining which variables are best to correlate to the operating conditions of the saltwater disposal pump system 120 (e.g., the saltwater disposal pump assembly 125a) by performing a correlation of data between different variables through python programming and identifying the most dependent variables that impacts the equipment such that the data may be validated in real time data coming from the instrument module 135a (i.e., field instrumentations) and proactively pinpoint any abnormal misleading behavior currently occurring in the saltwater disposal pump assembly 125a of the saltwater disposal pump system 120. As such, a passive and proactive approach to validating operating statuses of the saltwater disposal pump system 120 (e.g., the saltwater disposal pump assemblies 125a, 125b, 125c, 125d) predicted by the model eliminating errors, delays and human intervention required in conventional systems.

Moreover, in some embodiments, the abnormal operating conditions validation unit 115 may be used to produce data, such as establishing thresholds for the pre-alarm threshold, the alarm threshold, and the trip threshold, as described in greater detail herein. In some embodiments, the abnormal operating conditions validation unit 115 provides commands to the saltwater disposal pump system 120 (e.g., to each of the saltwater disposal pump assemblies 125a, 125b, 125c, 125d (and components thereof)) such as inhibit operations commands, switchover commands, and the like. Further, the abnormal operating conditions validation unit 115 may communicate movements, or lack of movements, of each of the saltwater disposal pump assemblies 125a, 125b, 125c, 125d of the saltwater disposal pump system 120 such that the operating condition samples may be gathered at discrete time intervals. As such, the abnormal operating conditions validation unit 115 may receive data from various sources (e.g., from the plurality of sensors 130a, 130b, 130c, 130d, the instrument modules 135a, 135b, 135c, 135d, the electronic computing device 110, and the like) through sequences of operation for real-time calculations or algorithms. As such, the abnormal operating conditions validation unit 115 may contain the requisite processing device, hardware, software, and/or the like, to perform the functionalities set forth in detail below in FIG. 3.

It should be understood that the illustrative operating conditions validating system 100 and components thereof (e.g., the abnormal operating conditions validation unit 115, the electronic computing device 110, and/or the like) may gather and transform data for better estimating, predicting, and/or validating an actual, real time operating conditions of the saltwater disposal pump system 120 rather than merely relying on human intervention, unsubstantiated or non-validated data, and the like that may lead to erroneous determinations or readings. As such, the components of the illustrative operating conditions validating system 100 may transform data for analysis and/or validates either raw data received from the each of the plurality of sensors 130a, 130b, 130c, 130d, or transformed data either by or through the instrument modules 135a, 135b, 135c, 135d, respectively, and/or the electronic computing device 110, to determine whether potential alarms generated on the machine side are authentic using various logic modules, machine learning techniques, and/or the like, and to automatically dispatch a technician when validated to either preform a repair, preventative maintenance, and the like, on the machine while simultaneously switching the machine over to another working machine, when necessary, as discussed in greater detail herein.

It should be understood that while the electronic computing device 110 is depicted as a personal computer and the abnormal operating conditions validation unit 115 is depicted as a generic controller, these are merely examples. Depending on the embodiment, any type of computing device (e.g., mobile computing device, personal computer, server, and the like) may be utilized for any of these components. Similarly, some embodiments are configured with the abnormal operating conditions validation unit 115 and/or the electronic computing device 110 are integrated as a special purpose computer with one or more of the saltwater disposal pump system 120 (e.g., the saltwater disposal pump assemblies 125a, 125b, 125c, 125d). Additionally, while each of these computing devices are illustrated in FIG. 1A as a single piece of hardware, this is also an example. More specifically, each of the electronic computing device 110 and the abnormal operating conditions validation unit 115 may represent a plurality of computers, servers, databases, and the like. Further, the abnormal operating conditions validation unit 115 may be remote from saltwater disposal pump system 120 and is thus may be a server computing device.

It should also be understood that while the embodiments depicted herein refer to a network of computing devices, the present disclosure is not solely limited to such a network. In some embodiments, the various processes described herein may be completed by a single computing device, such as a non-networked computing device or a networked computing device that does not use the network to complete the various processes described herein.

FIG. 1B depicts an operating condition modeling system 140 that provides input data and implements results of condition modeling and verification, according to embodiments provided herein. As illustrated, only the saltwater disposal pump assemblies 125a, 125b, 125c, are active and pumping or transferring the saltwater to a destination. Further, as depicted, the saltwater disposal pump system 120 may also include and/or be coupled with a saltwater disposal pump transmitter 145a (which may be configured as a transmitter, receiver and/or a transceiver) for communicating the data from the saltwater disposal pump system 120 to the abnormal operating conditions validation unit 115. It will be understood that on sites that have a plurality of different pieces of hardware, each piece of hardware may be equipped with a radio frequency (RF) tag or other transmitter that may broadcast or otherwise communicate this sensor data to the abnormal operating conditions validation unit 115. In some embodiments, each piece of hardware on a site may be coupled with a computing device that collects and organizes the data before sending to the abnormal operating conditions validation unit 115. It will also be understood that each site may include different the saltwater disposal pump assemblies 125a, 125b, 125c, 125d and the associated sensors, communication hardware, and computing infrastructure for communicating with the abnormal operating conditions validation unit 115, as discussed in greater detail herein. That is, one site may include the saltwater disposal pump assemblies 125a, 125b, and a different site may include the saltwater disposal pump assemblies 125c, 125d, that together define the saltwater disposal pump system 120 and each communicate data via the saltwater disposal pump transmitter 145a from the saltwater disposal pump system 120 (e.g., from the plurality of sensors 130a, 130b, 130c, 130d of the saltwater disposal pump assemblies 125a, 125b, 125c, 125d respectively) to the abnormal operating conditions validation unit 115. In other embodiments, there may be more than one saltwater disposal pump transmitters.

The abnormal operating conditions validation unit 115 may also include or be coupled with an abnormal operating conditions validation unit receiver 145b (which may be configured as a transmitter, receiver and/or a transceiver) for receiving the sensor data from the saltwater disposal pump system 120 (e.g., from the plurality of sensors 130a, 130b, 130c, 130d of the saltwater disposal pump assemblies 125a, 125b, 125c, 125d, respectively). In other embodiments, there may be more than one abnormal operating conditions validation unit receiver 145b. Depending on the embodiment, the abnormal operating conditions validation unit 115 may receive sensor data from dozens, hundreds, or even thousands of different pieces of hardware and various locations across the globe. The abnormal operating conditions validation unit 115 may include operational disposal data memory 150 (denoted in FIG. 1B as 8) for storing the received sensor data. Depending on the particular embodiment, the operational disposal data memory 150 may be configured as random access memory (RAM), read only memory (ROM), registers, a database, and/or other hardware for storing the sensor data. As such, the operational disposal data memory 150 may be part of the memory device 212 (FIGS. 2A, 2B), the data storage device 216 (FIGS. 2A, 2C), and/or part of other data storage infrastructure.

An operational fluid disposal data processing module 155 (denoted in FIG. 1B as μC), represents software operations that are performed with, to, and/or on the sensor data obtained from the technical operations. The operational fluid disposal data processing module 155 may include one or more pieces of software (such as the alert logic 234, the validation logic 236, the switchover logic 238 and/or the current operating conditions logic 240 and/or other logical modules) and may be configured for monitoring actual conditions of the various components of the saltwater disposal pump system 120 (e.g., the saltwater disposal pump assemblies 125a, 125b, 125c, 125d) and validating an alert of an abnormal operating condition, as described with reference to FIGS. 2A-10.

The abnormal operating conditions validation unit 115 may also include an operational fluid disposal data output translation module 160 that is configured to create instructions to implement the results of this analysis. The operational fluid disposal data output translation module 160 may comprise any hardware configured to translate the output of the operational fluid disposal data output translation module 160 into a form that can be used in the control of technical operations within the system and which, for example, may comprise a hardware driver or controller, a control data transmitter, a document printer, a data display, or any other hardware that generates an operations output that can be used in the system to alter, enhance, or otherwise control technical operations or create a technical effect within the system. The operational fluid disposal data output translation module 160 may be configured as part of the operational disposal data memory 150 and/or may be configured as a separate piece of hardware and/or software. These instructions may be communicated via an abnormal operating conditions validation unit transmitter 165a, (which may or may not be the same hardware as the abnormal operating conditions validation unit receiver 145b) to the saltwater disposal pump system 120 to change operating statuses of the various machines (e.g., the saltwater disposal pump assemblies 125a, 125b, 125c, 125d). As such, the saltwater disposal pump system 120 may include or be coupled with a saltwater disposal pump receiver 165b for receiving the instructions and implementing the alert, inhibiting of the various machines (e.g., the saltwater disposal pump assemblies 125a, 125b, 125c, 125d) and/or automatic switchover of the machines (e.g., the saltwater disposal pump assemblies 125a, 125b, 125c, 125d). For example, the operational fluid disposal data output translation module 160 may transmit commands to inhibit operation of the saltwater disposal pump assembly 125a while switching over those operations to the saltwater disposal pump assemblies 125d, which was previously inactive.

Figure 2A:
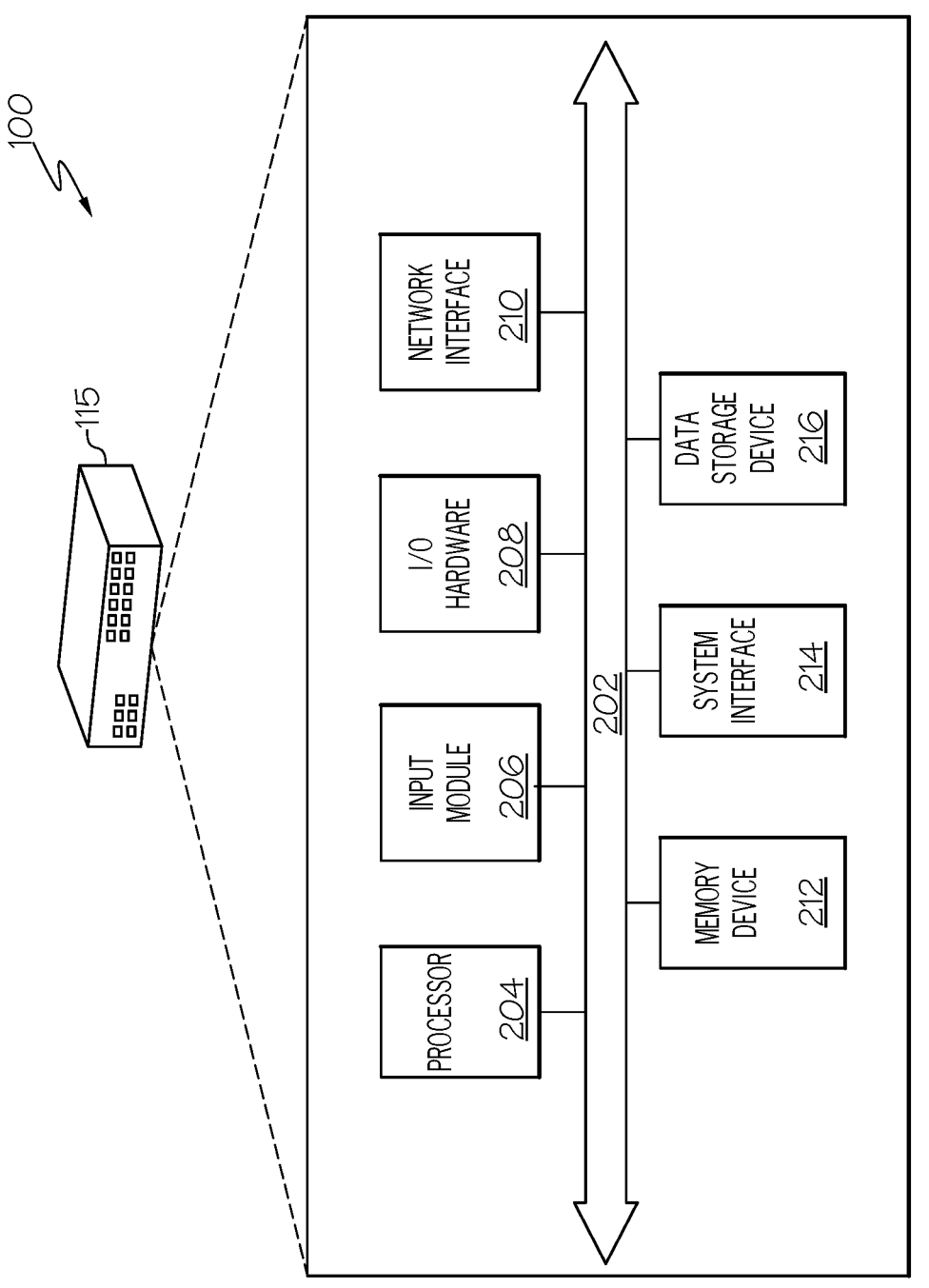
FIG. 2A schematically depicts illustrative hardware and software components of an operating abnormal operating conditions validation unit of the illustrative operating conditions validating system of FIG. 1A, according to one or more embodiments described and illustrated herein.

Now referring to FIGS. 1 and 2A, where FIG. 2A depicts the abnormal operating conditions validation unit 115, further illustrating a system that identifies and/or validates current operating conditions of the various machines (e.g., the saltwater disposal pump assemblies 125a, 125b, 125c, 125d) within the saltwater disposal pump system 120 by utilizing hardware, software, and/or firmware, according to embodiments shown and described herein. The abnormal operating conditions validation unit 115 may include a non-transitory, computer readable medium configured for receiving raw data and/or transformed data from various sources (e.g., the electronic computing device 110, the instrument modules 135a, 135b, 135c, 135d of the saltwater disposal pump assemblies 125a, 125b, 125c, 125d respectively, and/or the like), performing the various functions described herein such as those discussed with respect to FIG. 3, providing validation such that commands may be issued to automatically alert or notify a technician, commands to automatically stop a movement of the machine that is current experiencing abnormal operating conditions (e.g., one or more of the saltwater disposal pump assemblies 125a, 125b, 125c, 125d), and automatic switchover of machines from the machine experiencing the abnormal operating condition to the machine operating within a normal operating conditions (e.g., a different one of the saltwater disposal pump assemblies 125a, 125b, 125c, 125d), and/or the like, embodied as hardware, software, and/or firmware, according to embodiments shown and described herein.

While in some embodiments, the abnormal operating conditions validation unit 115 may be configured as a general purpose computer with the requisite hardware, software, and/or firmware, in other embodiments, the abnormal operating conditions validation unit 115 may be configured as a special purpose computer designed specifically for performing the functionality described herein. For example, the abnormal operating conditions validation unit 115 may be a specialized device that particularly receives raw and/or transformed data, analyzes and validates the data by applying machine learning and regression processes, or algorithms, to the data to generate a model for determining an actual, real time, operating conditions of the machines of the saltwater disposal pump system 120 (e.g., the saltwater disposal pump assemblies 125*a*, 125*b*, 125*c*, 125*d*) to derive an expected value for the plurality of data utilizing a statistical regression analysis. The statistical regression analysis may include at least one statistical regression formula that includes as variables the data from the plurality of sensors 130*a*, 130*b*, 130*c*, 130*d* of the saltwater disposal pump assemblies 125*a*, 125*b*, 125*c*, 125*d* respectively, compare the expected value with a corresponding history of each of the plurality of data from the plurality of sensors 130*a*, 130*b*, 130*c*, 130*d* from each of the saltwater disposal pump assemblies 125*a*, 125*b*, 125*c*, 125*d* respectively. That is, the history may be a previously live data (e.g., previous real time data) received from each sensor of the plurality of sensors 130*a*, 130*b*, 130*c*, 130*d* to be independently compared to determine a previous operating condition and/or history of data for each individual corresponding machine of the saltwater disposal pump assemblies 125*a*, 125*b*, 125*c*, 125*d*. The abnormal operating conditions validation unit 115 may be further configured to determine whether the trend of the expected value correlates with the history of the plurality of data from the specific sensor data (e.g., from one of the plurality of sensors 130*a*, 130*b*, 130*c*, 130*d*) gathered, retrieved, or received from the target or desired machine for analysis where the history of the plurality of data gathered, retrieved, or received exceeds the alarm level, as discussed in greater detail herein.

The abnormal operating conditions validation unit 115 may be configured to determine whether the correlation is a deviation from a predefined operating profile for each of the variables. The abnormal operating conditions validation unit 115 may, when the deviation is determined, determine whether the deviation in the predefined operating profile for each of the variables exceeds a predetermined threshold value, and validate the alarm received from the corresponding instrument module 135*a*, 135*b*, 135*c*, 135*d* of the target machine (e.g., the saltwater disposal pump assemblies 125*a*, 125*b*, 125*c*, 125*d*) and/or the electronic computing device 110 indicative of the abnormal machine operation with the deviation in the predefined operating profile for each of the variables that exceeds the predetermined threshold value.

Further, the abnormal operating conditions validation unit 115 may be configured to then provide or output an alert to the technician and/or commands to instrument module and/or to the electronic computing device 110 communicatively coupled to the saltwater disposal pump system 120 to automatically inhibit further operation of the machine (e.g., one or more of the saltwater disposal pump assemblies 125*a*, 125*b*, 125*c*, 125*d*) in which the data is validated as abnormal operating conditions, and may, simultaneously, perform a switchover to change to a different machine of the saltwater disposal pump system 120 that is operating normally (e.g., from one of the saltwater disposal pump assemblies 125*a*, 125*b*, 125*c*, 125*d* to a different one of the saltwater disposal pump assemblies 125*a*, 125*b*, 125*c*, 125*d*). For example, when the data is validated as abnormal operating conditions for the saltwater disposal pump assembly 125*a*, then the abnormal operating conditions validation unit 115 may automatically inhibit further operation of the saltwater disposal pump assembly 125*a* and may, simultaneously, perform a switchover command to change the operation to another saltwater disposal pump assembly that may have been previously not in an operation state or may increase operations of a plurality of saltwater disposal pump assemblies (e.g., the saltwater disposal pump assemblies 125*b*, 125*c*, 125*d*) to keep the same output of the saltwater disposal pump system 120 without the operation of the validated abnormally operating saltwater disposal pump assembly 125*a*.

As such, the abnormal operating conditions validation unit 115 is configured to passively monitor and/or validate data received from the saltwater disposal pump system 120 (e.g., from the saltwater disposal pump assemblies 125*a*, 125*b*, 125*c*, 125*d* (and components thereof)) for the purposes of improving the accuracy, determining undesirable conditions, such as a current, real time operating condition, predicting failures, wear, and the like, and provides results and/or generates data based on the determined undesirable conditions. In other embodiments, the abnormal operating conditions validation unit 115 may provide data to the technician that may be remotely located from the saltwater disposal pump system 120 via an alert, notification, or otherwise get the attention of the technician on a personal computing device (e.g., laptop, smart phone, tablet, and the like). Further, in some embodiments, the abnormal operating conditions validation unit 115 may provide data to the electronic computing device 110, or other devices of the illustrative operating conditions validating system 100, such as providing a notification when the undesirable condition is determined by highlighting the undesirable condition, sending a notification of the undesirable condition, ranking the various undesirable conditions for the various components of the machines in the saltwater disposal pump system 120, and/or are otherwise indicated or distinguished within the displayed results, as discussed in greater detail herein.

As also illustrated in FIG. 2A, in other embodiments, the abnormal operating conditions validation unit 115 may include a processor 204, input module 206, I/O hardware 208, network interface hardware 210, a system interface 214, a data storage device 216, which stores a database of display data 250, alert data 252, regression formula data 254, switchover data 256, predefined operating profile data 258, predetermined alarm data 260, events data 262, history data 264, model data 266, plurality of sensors data 268, and a memory device 212. The memory device 212 may be non-transitory computer readable memory. The memory device 212 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory device 212 may be configured to store operating logic 230, display logic 232, alert logic 234, validation logic 236, switchover logic 238, and current operating conditions logic 240 (each of which may be embodied as a computer program, firmware, or hardware, as an example). The memory device 212 may be included with, a part of, and/or work in conjunction with the operational fluid disposal data processing module 155, the operational disposal data memory 150, and/or the operational fluid disposal data output translation module 160. A local interface 202 is also included in FIG. 2A and may be implemented as a bus or other interface to facilitate communication among the components of the abnormal operating conditions validation unit 115.

The processor 204, such as a central processing unit (CPU), may be the central processing unit of the abnormal operating conditions validation unit 115, performing calculations and logic operations to execute a program. The processor 204, alone or in conjunction with the other components, is an illustrative processing device, computing device, electronic control unit, or combination thereof. The processor 204 may include any processing component configured to receive and execute instructions (such as from the data storage device 216 and/or the memory device 212). The processor 204 may be included with, a part of, and/or work in conjunction with the operational fluid disposal data processing module 155.

Still referring to FIG. 2A, the input module 206 may include tactile input hardware (i.e. a joystick, a keyboard, a mouse, a knob, a lever, a button, and/or the like) that allows the user to directly input settings. The I/O hardware 208 may communicate information between the local interface 202 and one or more other components of the illustrative operating conditions validating system 100 (FIG. 1A). For example, the I/O hardware 208 may act as an interface between the abnormal operating conditions validation unit 115 and other components, such as the electronic computing device 110 (FIG. 1A), and/or the like. In some embodiments, the I/O hardware 208 may be utilized to transmit one or more commands to the other components of the illustrative operating conditions validating system 100 (FIG. 1A).

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the abnormal operating conditions validation unit 115 and the other components of the illustrative operating conditions validating system 100 depicted in FIG. 1A, including, but not limited to, the electronic computing device 110, the saltwater disposal pump assemblies 125a, 125b, 125c, 125d and/or the like, as depicted in FIG. 1A.

The system interface 214 may generally provide the abnormal operating conditions validation unit 115 with an ability to interface with one or more external devices such as, for example, the electronic computing device 110, the saltwater disposal pump assemblies 125a, 125b, 125c, 125d and/or the like depicted in FIG. 1A. Communication with external devices may occur using various communication ports (not shown). An illustrative communication port may be attached to a communications network. Further, the system interface 214 may permit information from the local interface 202 to be provided to the user, whether the user is local to the abnormal operating conditions validation unit 115 or remote from abnormal operating conditions validation unit 115 (e.g., a user of the electronic computing device 110 (FIG. 1A)). Still referring to FIG. 2A, the system interface 214 may include hardware configured to transmit data to the technician and/or to the electronic computing device 110 (FIG. 1A) such that information is displayed on the display in audio, visual, graphic, or alphanumeric format and/or receive inputs.

Figures 2B, 2C:
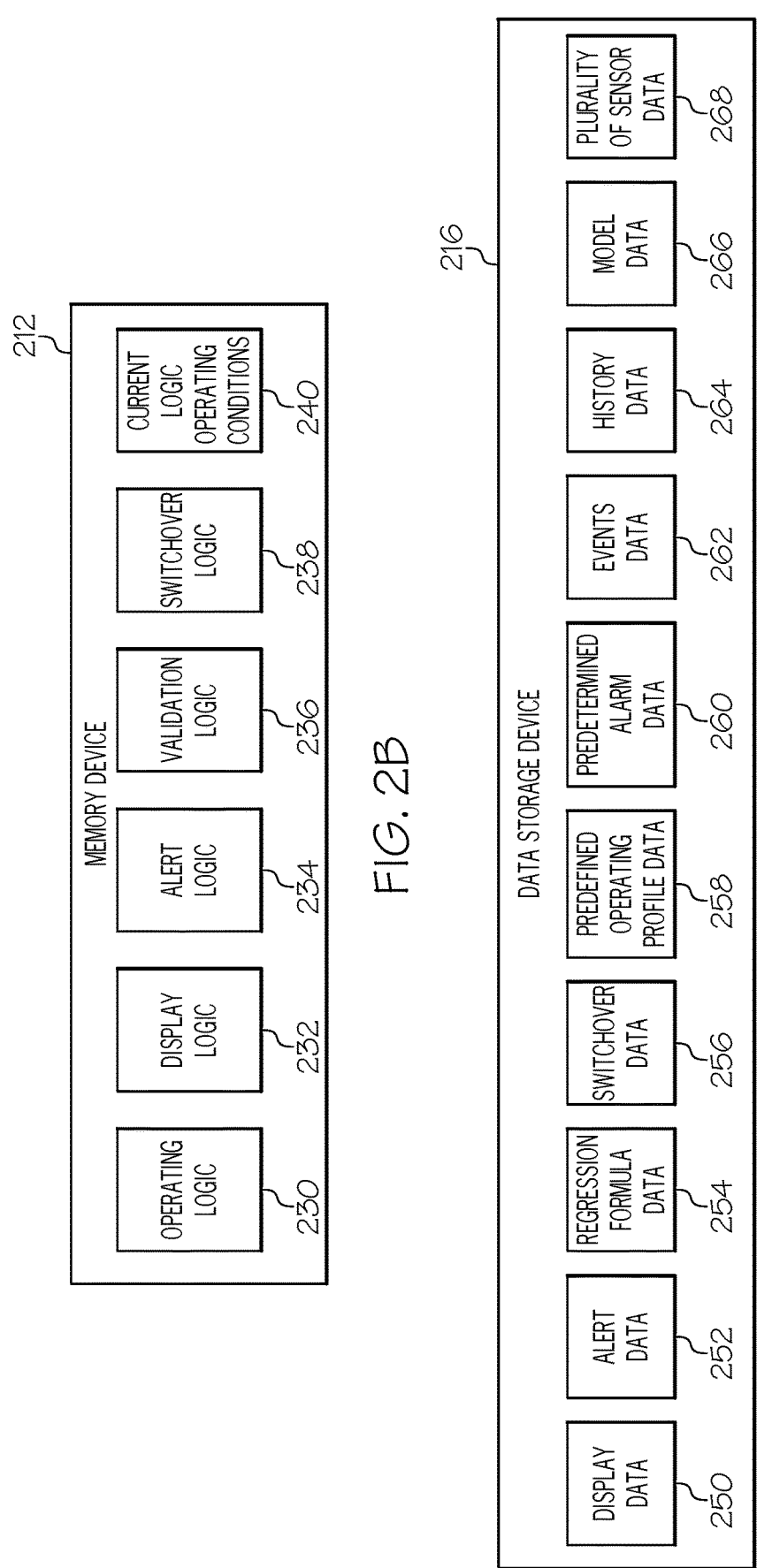
FIG. 2B schematically depicts an illustrative memory device containing illustrative logic components, according to one or more embodiments shown and described herein.
FIG. 2C schematically depicts an illustrative data storage device containing illustrative data components, according to one or more embodiments shown and described herein.

With reference to FIG. 2B, in some embodiments, the program instructions contained on the memory device 212 may be embodied as a plurality of software modules, where each module provides programming instructions for completing one or more tasks. For example, FIG. 2B schematically depicts the memory device 212 containing illustrative logic components according to one or more embodiments shown and described herein. As shown in FIG. 2B, the memory device 212 may be configured to store various processing logic, such as, for example, operating logic 230, display logic 232, alert logic 234, validation logic 236, switchover logic 238, and current operating conditions logic 240 (each of which may be embodied as a computer program, firmware, or hardware, as an example). The operating logic 230 may include an operating system and/or other software for managing components of the abnormal operating conditions validation unit 115. Further, the operating logic 230 may contain one or more software modules for transmitting data, receiving data, storing data, and/or analyzing data.

Still referring to FIG. 2B, the display logic 232 may contain one or more software modules for converting data into a display format, such as on-demand graphical representations of the various operating conditions of each of the saltwater disposal pump assemblies 125a, 125b, 125c, 125d and/or components thereof, and the like, displaying current actual, or real time operating conditions, validated data, and/or display of notifications and/or alerts to the user, as will be discussed in greater detail herein.

The alert logic 234 may contain one or more software modules for generating a machine stop command when the operating condition value is at or below certain predetermined thresholds, alerting or notifying the technician when the operating condition value is at, or below certain predetermined thresholds, and/or the like. The alert may be an audio alert, such as an audible sound, a text alert, such as a push notification warning on a screen of the electronic computing device 110 (FIG. 1A), a command to saltwater disposal pump system 120, (FIG. 1A), an electronic mail to the technician, a combination thereof, and/or the like. The alert may be preselected from a plurality of alert types.

The validation logic 236 may contain one or more software modules for receiving a plurality of data indicative of the current operating conditions of the machine (e.g., the saltwater disposal pump assemblies 125a, 125b, 125c, 125d and components thereof) with deviated variables (e.g., specific metrics and/or sensed outputs indicative of machine performance has deviated) and performing regression analyses to derive an expected value. The regression analysis uses a pre-established correlated constants for each of the sensed metrics (e.g., the data from each of the plurality of sensors 130a, 130b, 130c, 130d for each of the saltwater disposal pump assemblies 125a, 125b, 125c, 125d) such as the suction strainer differential pressure, the suction flow, the discharge pressure, the suction pressure, vibrations, and the temperature) for the specific type of machine (e.g., a turbine, compressor, saltwater disposal, and the like).

The validation logic 236 may include and/or use a lookup table and/or the like that establishes the correlation between the correlated constants and the current, real time values for each of the variables in the regression analyses (e.g., the data from each of the plurality of sensors 130a, 130b, 130c, 130d). As such, a formula is derived by a regression analysis technique where correlation between different variables through python programming is performed and the most dependent variables that impacts the saltwater disposal pump system 120 (e.g., the saltwater disposal pump assemblies 125a, 125b, 125c, 125d) is identified. For example, an example regression formula for a compressor axial vibration is disclosed below in Equation 1:

$$A = 0.074 + (0.000289)(SSD) + 0.003879(SF) + (-0.000015)(DP) + \tag{1}$$
$$(-0.009386)(AD1) + 0.010630(AD2) + (-0.000614)(SP)$$

where the constants are pre-established based on the specific correlation of data of the various operating conditions of the specific machine; SSD is the current suction strainer differential pressure; SD is a suction flow; DP is a discharge pressure; AD1 is an axial displacement sensed by an accelerometer; AD2 is an axial displacement sensed by a proximately sensor; and SP is a suction pressure.

The expected value A is derived from the regression equation (1) above and is compared with a history of the plurality of variables that may be the last sensed output data or may be known to be in acceptable operation ranges. When the data correlates, this is indicative of an actual machine performance loss and a deviation from the expected value with respect to a known predefined operating profile is determined and whether the deviation is within an acceptable deviation range. As such, the validation logic 236 is configured to use algorithms, machine learning, regression analysis, and/or the like to validate the real time data coming from the saltwater disposal pump system 120 (e.g., the electronic computing device 110, the field instrumentations (e.g., the instrument modules 135a, 135b, 135c, 135c), and the like) to proactively pinpoint any abnormal misleading behavior that may in conventional systems be overlooked or not have a deviation that can yet be determined leading to major failures and malfunctions.

As such, the validation logic 236, alone or in combination with other components of the illustrative operating conditions validating system 100 (FIG. 1A) utilize equations and algorithms that are configured to assess equipment performance, automatically trigger anomalies without the need for human intervention, and predicts equipment failure at a very early stage with a minimal maintenance cost. Further, improvements in maintenance and root cause analysis are achieved and a reduction in data collection is needed since the data gathered is real-time data of the machines on the saltwater disposal pump system 120.

Further, the validation logic 236 may perform calculations to use as inputs into a machine learning algorithm and/or a statistical regression analysis. For example, the validation logic 236 may adjust the constants and/or the current sensor data (e.g., adjust data received from any one or each of the plurality of sensors 130a, 130b, 130c, 130d) to account for drift in the data due to environmental influences such as higher operating temperatures, increased humidity, and/or the like. In some embodiments, the validation logic 236 may include a manually input offset value to account for any change in the saltwater disposal pump system 120 due to temperature, debris, humidity, and/or the like.

Still referring to FIG. 2B, the switchover logic 238 may contain one or more software modules for automatically switching operation from one machine that has been validated as operating abnormally to a different machine of the saltwater disposal pump system 120 that is functioning with normal operating conditions. For example, without limitation, when one of the machines in the saltwater disposal pump system 120, for example, the saltwater disposal pump assembly 125a is determined to be operating abnormally, the switchover logic 238 may automatically inhibit further operation of the saltwater disposal pump assembly 125a, and, either simultaneously, or in a sequence of events, automatically switch the operations over to at least a different machine, such as the saltwater disposal pump assemblies 125b, and/or to a group of machines, such as the saltwater disposal pump assemblies 125b, 125c, 125d, of the saltwater disposal pump system 120 who together increase an output such that the system maintains the output without the saltwater disposal pump assembly 125a. Further, the switchover logic 238 may push updated status to the user interface that is displayed on the electronic computing device 110 (FIG. 1A) and/or provide commands for the alert logic 234 to push alerts/notifications to the technician, as discussed in greater detail herein.

Further, the switchover logic 238 may contain one or more software modules for monitoring energy efficiencies and optimization of the machines in the saltwater disposal pump system 120 automatically switch use of certain machines to improve energy optimization. For example, an outlet water flow in relation to a number of running pumps taking in consideration the pump maximum capacity for each of the pumps in the machine system may be determined and, for optimization purposes, switchover suggestions and/or automatic switchover between various machines may be commanded by the switchover logic 238.

The current operating conditions logic 240 may contain one or more software modules for monitoring and receiving the plurality of data related to each machine in the saltwater disposal pump system 120. In some embodiments, the current operating conditions logic 240 may cause the electronic computing device 110 to initiate independently each one of the plurality of sensors 130a, 130b, 130c, 130d, each of the instrument modules 135a, 135b, 135c, 135d, and/or receive or gather certain data. As such, the data received may be continuous or may be predetermined intervals or discrete times and may be based on the current operating condition of the machine within the saltwater disposal pump system 120. For example, if the machine (e.g., the saltwater disposal pump assembly 125a) is not operating or offline, the current operating conditions logic 240 may not request data or the machine may not be capable of providing data.

Still referring to FIG. 2B, it should be understood that the operating logic 230, display logic 232, alert logic 234, validation logic 236, switchover logic 238, and current operating conditions logic 240 may simultaneously operate, in real time, and may determine when predictive maintenance is warranted, when a machine should be inhibited from movement and automatically switch the machine functions to a similar machine operating normally, and to alert the technician and/or display the data such that a maintenance technician may be contacted to repair and/or replace the components of the machine when an undesirable condition is detected.

As such, the condition for each machine of the saltwater disposal pump system 120 may be remotely and passively monitored and/or tracked to monitor data related to determining the current operating conditions thereof. Therefore, unknown undesirable conditions for each machine of the saltwater disposal pump system 120 are reduced or eliminated as well as prematurely replacing components, false alarms, and not detecting abnormalities prior to failure may be reduced or eliminated. The embodiments described herein generate a model of the correlation between different variables through python programming and identified the most dependent or correlated variables that impact the machines and validates the real time data incoming from the machines of the saltwater disposal pump system 120 to passively and proactively pinpoint any abnormal behavior of the machine.

FIG. 2C schematically depicts a block diagram of various data contained within a storage device (e.g., the data storage device 216). It should be understood that the data storage device 216 may reside local to and/or remote from the abnormal operating conditions validation unit 115 and may be configured to store one or more pieces of data for access by the abnormal operating conditions validation unit 115 and/or other components, identify the current operating conditions to use regression analysis techniques to determine whether the current operating conditions are in fact abnormal, and determine whether an alert should be sent or pushed to the technician to cause the technician to react and provide support to the machine and whether the machine should automatically be idled down and those operations automatically switched over to another, similar machine, of the saltwater disposal pump system 120 to perform those duties. As discussed above, the data storage device 216 may be included with, a part of, and/or work in conjunction with the operational fluid disposal data processing module 155, the operational disposal data memory 150, and/or the operational fluid disposal data output translation module 160.

As shown in FIG. 2C, the data storage device 216 may include, for example, a plurality of display data 250, such as data related to the current machine operation, fault logs, various switchover monitoring, and the like, that may be displayed graphically, such as a line chart, indicators, bar charts, column charts, pie charts, area charts, pivot tables, bubble charts, trec maps, polar charts, scatter charts, and other graphical user interfaces, and/or the like.

Still referring to FIG. 2C, the data storage device 216 further includes the alert data 252, such as different predetermined or user customized threshold values for the estimated or prediction of premature failure or wear of components of the machine status. For example, the alert data 252 may include data related to various output fault states. For instance, the alert data 252 may be populated with data related to at least one threshold level with respect to the various estimated failures for the type of the machine that is monitored. For example, a first threshold level may be set for any estimated near future failure (predication maintenance) that are above or below a predetermined degradation range threshold. That is, the current conditions of the machine that are monitored may have minimal deviation indicating only minimal degradation and/or wear. As such, action is not required immediately, but to prevent a future major failure, certain components may need to be replaced or otherwise require a technician to attend. The alert output for such a threshold may be as referred to as a minimal degradation, a minimum fault condition or a pre-alert or pre-alarm level.

A second threshold level may encompass a second range of predetermined abnormal operating conditions. The second threshold level indicates a more urgent or more severe degradation and/or wear of the components of the machine, and may alert the technician when the current operating conditions are within the second range of predetermined abnormal operating conditions. It should also be understood that the second range of predetermined abnormal operating conditions may be triggered if the plurality of data from any of the plurality of sensors 130a, 130b, 130c, 130d, independently for each of the saltwater disposal pump assemblies 125a, 125b, 125c, 125d respectively, and/or the instrument modules 135a, 135b, 135c, 135d, independently for each of the saltwater disposal pump assemblies 125a, 125b, 125c, 125d respectively, indicate that the abnormal operating conditions exceed a predetermined value due to some degradation occurring and require immediate attention of the technician. As such, an alert at this level may require a technician to perform additional checks, maintenance, further investigation, and/or the like, on the target or desired machine of the saltwater disposal pump system 120 that is identified as operating with abnormal operating conditions that exceed the predetermined value. The alert output for such this threshold may be as referred to as an alarm-level alert.

A third threshold level or range may encompass any validated abnormal operating conditions that exceed or are below a minimum operational machine condition standard.

The third threshold level is the most severe threshold level or range indicating that significant degradation and/or most significant abnormal operating conditions are currently occurring in the monitored machine of the saltwater disposal pump system 120. A command at the third threshold level or range may be sent to the electronic computing device 110 (FIG. 1A), the instrument modules 135a, 135b, 135c, 135d (FIG. 1A) and the like, to inhibit further operation of the machine (e.g., independently for each of the saltwater disposal pump assemblies 125a, 125b, 125c, 125d). Further, an alert is sent to the technician requiring immediate action by the technician. Additionally, a switchover command may be sent to the electronic computing device 110 (FIG. 1A), the instrument modules 135a, 135b, 135c, 135d (FIG. 1A) of another or a different machine in the saltwater disposal pump system 120 the like, to initiate or startup the different machine to take on the duties of the abnormal condition machine that is shut down, as discussed in greater detail above. The alert output for such a threshold may be as referred to as a trip level, or major alarm.

The data storage device 216 further includes the regression formula data 254. The regression formula data 254 may include the algorithms (whether mathematical equations, code, and the like, python programming code, and the like), the correlated constants for each machine of the saltwater disposal pump system 120 (e.g., the saltwater disposal pump assemblies 125a, 125b, 125c, 125d components thereof, and the like) that have been determined for each of the monitored metrics of the machine. For example, the predetermined correlated constants stored for the saltwater disposal pump assemblies 125a, 125b, 125c, 125d may include constants for each of the operating data sensed by each of the plurality of sensors 130a, 130b, 130c, 130d such as the suction strainer differential pressure, the suction flow, the discharge pressure, the suction pressure, the vibrations, and the temperature. Further, each constant may be offset or changed based on the type or model of the machine, environmental factors, and the like.

Still referring to FIG. 2C, the data storage device 216 may further include the switchover data 256. The switchover data 256 may include data related to the machines (e.g., each of the saltwater disposal pump assemblies 125a, 125b, 125c, 125d) of the saltwater disposal pump system 120 such as whether the machine is currently operating, (e.g., operating status), whether each of the saltwater disposal pump assemblies 125a, 125b, 125c, 125d previously had abnormal operation conditions (to not switchover to another machine with abnormal conditions), machine types, instrument module communication protocol for each of the machines (e.g., through the network 105 (FIG. 1A)), communication protocol for the electronic computing device 110 (FIG. 1A), and the like. Further, the switchover data 256 may store data related to efficiencies and power optimization of each of the machines of the saltwater disposal pump system 120.

The data storage device 216 may further include the predefined operating profile data 258. In some embodiments, the predefined operating profile data 258 may be dated that defines the predefined operating profile established by the data gathered from the plurality of sensors 130a, 130b, 130c, 130d when the respective saltwater disposal pump assemblies 125a, 125b, 125c, 125d was functioning normally. In other embodiments, the predefined operating profile data 258 may be the data that is correlated for each of the machines of the saltwater disposal pump system 120 (e.g., the saltwater disposal pump assemblies 125a, 125b, 125c, 125d) to establish a normal operating condition and the various different thresholds of abnormal operating conditions. As such, each of the data gathered or transmitted from the plurality of sensors 130a. 130b, 130c, 130d, and other machine metrics, may be used when the machine is known to be working as expected to define the operating profile for that particular machine. It should be appreciated that each machine of the saltwater disposal pump system 120 may have its own unique operating profile.

The data storage device 216 may further include the predetermined alarm data 260. The predetermined alarm data 260 may be data received from the electronic computing device 110 (FIG. 1A) indicative of an abnormal operating condition of the monitored machine and may include the alarm data, the data related to the abnormal operating condition, and the like, that will be validated using the methods and processes described in greater detail herein. The data storage device 216 may further include the events data 262. The events data 262 may keep an up count of the number of current threshold violations by machine for preventative maintenance purposes. For example, a machine may have intermittent or erratic abnormal conditions that spike or only occur at discrete intervals but does not stay within a predetermined threshold range that may otherwise trigger an alert. As such, regardless of abnormal operating condition remaining within an abnormal threshold range (or exceed a level or below a predetermined level), an abnormally may be detected based on the number of occurrences of the abnormality.

Still referring to FIG. 2C, the data storage device 216 further includes the history data 264. The history data 264 may include data related to the history of each of the operating data that is sensed by the plurality of sensors 130a, 130b, 130c, 130d such as the suction strainer differential pressure, the suction flow, the discharge pressure, the suction pressure, the vibrations, and the temperature. This history may be used to populate the predetermined operating profile or may be used to determine trends and other use information to validate the alarm from the electronic computing device 110 (FIG. 1A), as discussed in greater detail herein.

The data storage device 216 further includes the model data 266. The model data 266 may include data related to the model including data related to correlated constants, the metrics of the machine to use, the python programming, the statistical regression analysis, and the like, as discussed in greater detail herein. The data storage device 216 further includes the plurality of sensors data 268. The plurality of sensors data 268 may include the data received from each of the plurality of sensors 130a, 130b, 130c, 130d from each of the saltwater disposal pump assemblies 125a, 125b, 125c, 125d respectively, of the saltwater disposal pump system 120 Examples of the plurality of sensors data 268 may include the suction strainer differential pressure, the suction flow, the discharge pressure, the suction pressure, the vibrations, and the temperature.

As mentioned above, the various components described with respect to FIGS. 2A-2C may be used to carry out one or more processes to improve accuracy of determining undesirable conditions of the equipment and machines of the saltwater disposal pump system 120 using regression analysis and correlated constants, machine learning processes, and the like, to validate alarm data to improve the passive condition monitoring of the machines of the saltwater disposal pump system 120, alerting the technician to act by responding or otherwise intervene when certain predetermined parameters are triggered by predetermined threshold values or ranges for abnormal operating conditions, and displaying, in real time, the current operating conditions of the machines or equipment of the saltwater disposal pump system 120.

Further, it should be understood that the components depicted in FIGS. 2A-2C are merely illustrative and are not intended to limit the scope of this disclosure. More specifically, while the components in FIGS. 2A-2C are illustrated as residing within the abnormal operating conditions validation unit 115, this is a non-limiting example. In some embodiments, one or more of the components may reside external to the abnormal operating conditions validation unit 115. Similarly, while FIGS. 2A-2C is directed to the abnormal operating conditions validation unit 115, other components such as the electronic computing device 110 (FIG. 1A) and/or the instrument modules 135a, 135b, 135c, 135d of the saltwater disposal pump assemblies 125a, 125b, 125c, 125d respectively, as depicted in FIG. 1B, may include similar hardware, software, and/or firmware and may be configured to perform some or all of the functions and processes described herein.

Figure 3:
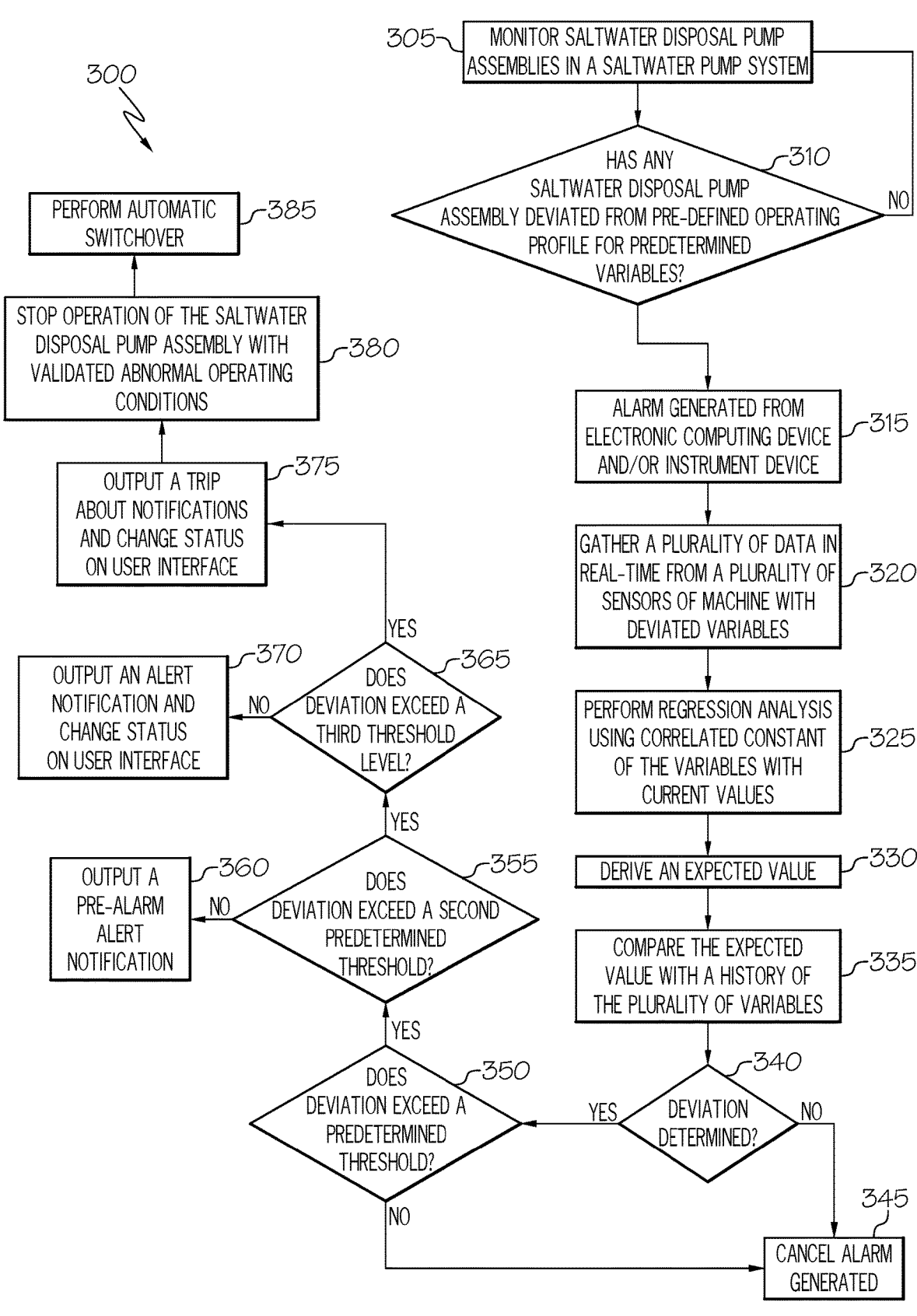
FIG. 3 depicts a flow diagram of an illustrative method for performing a validation of data indicative of an operating condition of the machine system of FIG. 1A, according to one or more embodiments shown and described herein.
Figure 4:
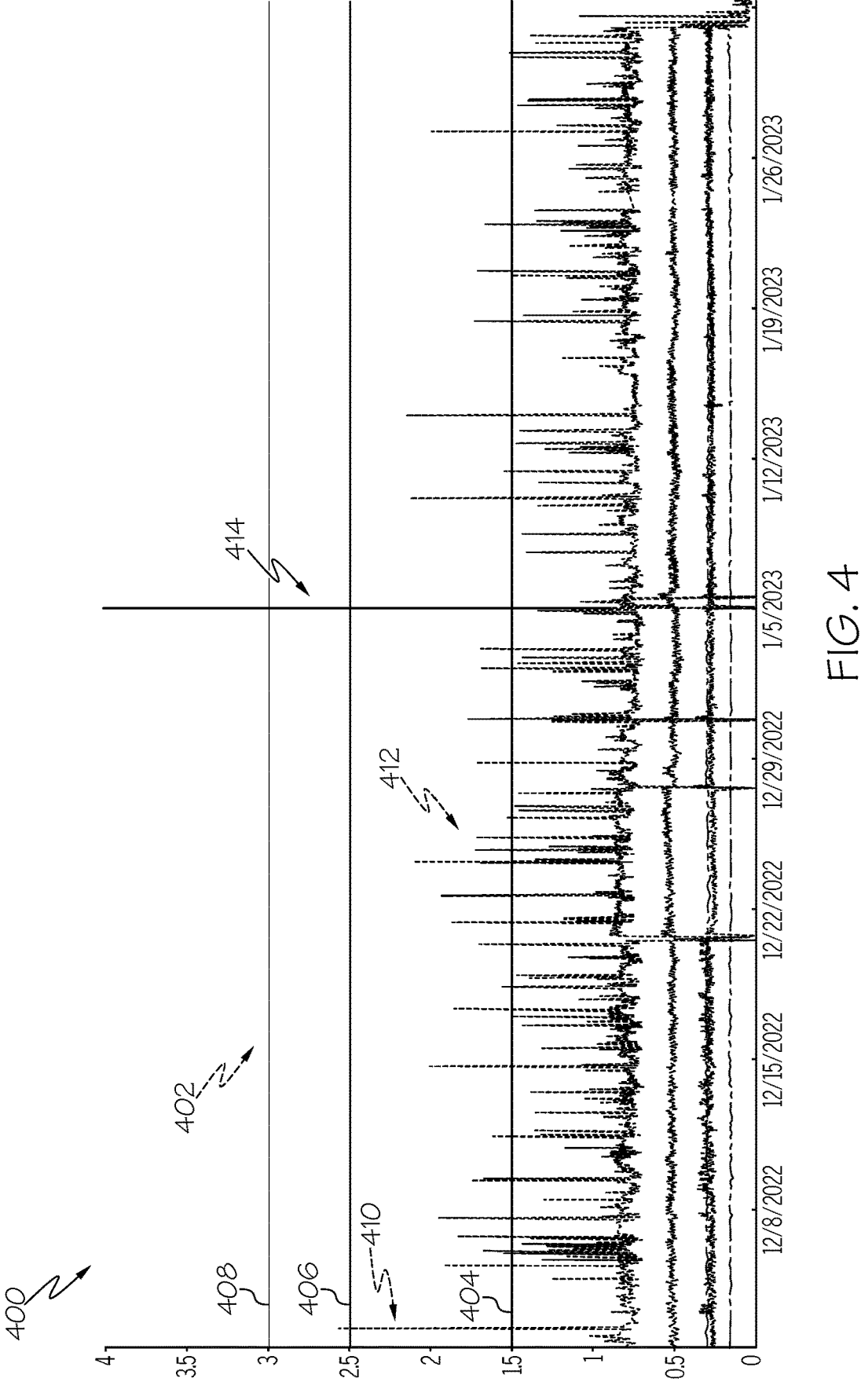
FIG. 4 schematically depicts an illustrative graphical representation of a data output of historical operating conditions and/or historical expected values over a predetermined period of time, according to one or more embodiments shown and described herein.
Figure 5:
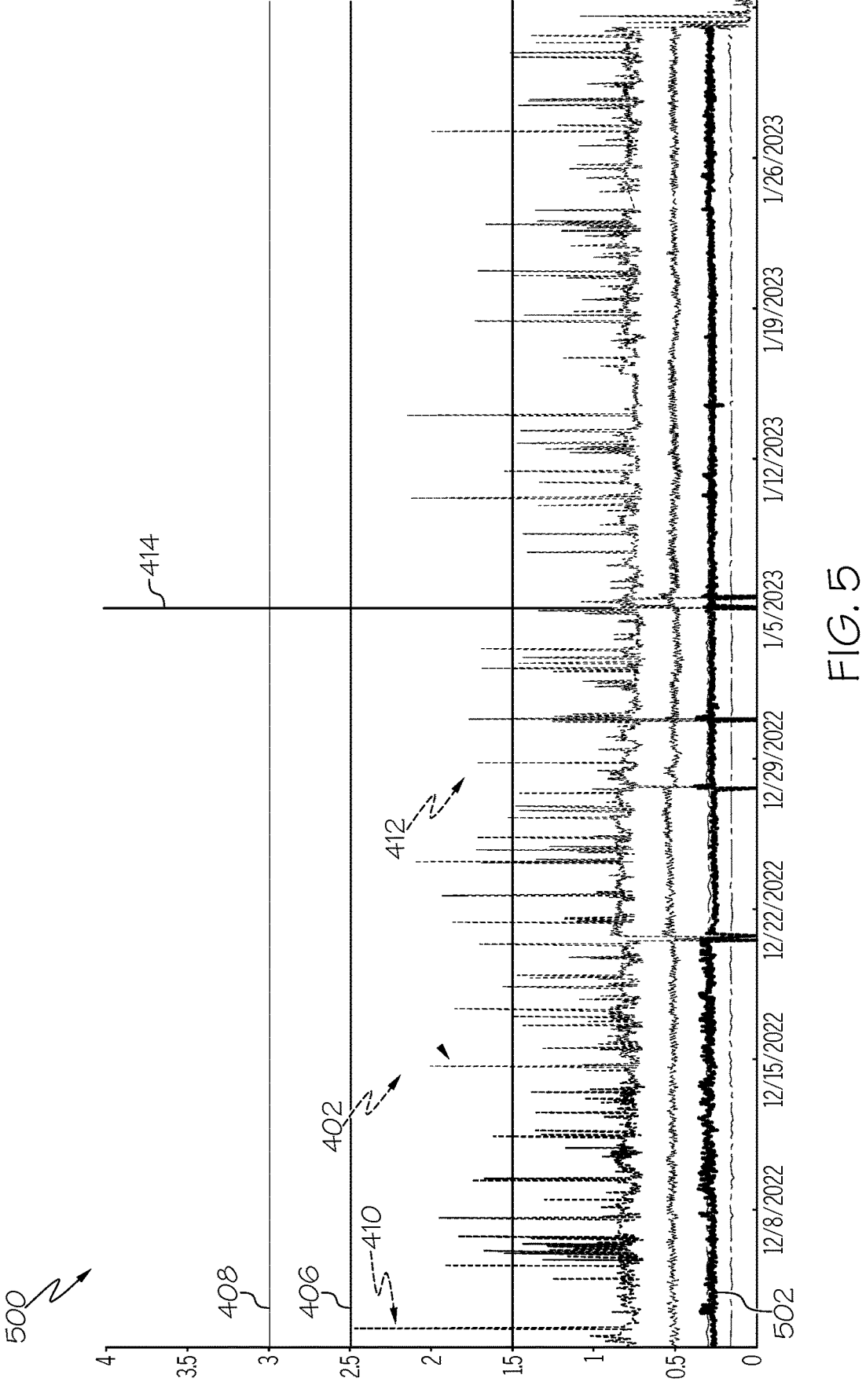
FIG. 5 schematically depicts an illustrative graphical representation of a trend of an expected value compared to the data output of FIG. 4 over the predetermined period of time, according to one or more embodiments shown and described herein.

Referring back to FIGS. 1 and 2A-2C and now to FIG. 3 which is a flow diagram that graphically depicts an illustrative process 300 of performing a validation of data indicative of an operating condition of a machine system, and to FIG. 4, which graphically depicts a pre-alarm setting, and to FIG. 5, which graphically depicts a trend line behavior using the regression formula to validate the given output as depicted in FIG. 4. Although the steps associated with the blocks of FIG. 3 will be described as being separate tasks, in other embodiments the blocks may be combined or omitted. Further, while the actions associated with the blocks of FIG. 3 will be described as being performed in a particular order, in other embodiments, the actions may be performed in a different order.

At block 305, the illustrative operating conditions validating system 100 monitors the current operating conditions of the plurality of machines in the saltwater disposal pump system 120 (e.g., the saltwater disposal pump assemblies 125a, 125b, 125c, 125d). The monitoring may be performed by any number and/or types of monitoring devices such as the electronic computing device 110 and the plurality of sensors 130a, 130b, 130c, 130d of the saltwater disposal pump assemblies 125a, 125b, 125c, 125d respectively, of the saltwater disposal pump system 120 may gather and/or transmit sensed data to the any number and/or types of monitoring devices such as the electronic computing device 110 indicative of current operating conditions of the machines and/or equipment of the saltwater disposal pump system 120. For example, data that has been predetermined to provide insight to machine performance to predict future failures at an early stage with a minimal maintenance cost using data validation through regression formula includes, without limitation, the suction strainer differential pressure, the suction flow, the discharge pressure, the suction pressure, the vibrations, and the temperature.

As illustrated in FIG. 4, the graphical representation 400 schematically illustrates a data output 402 of historical operating conditions and/or historical expected values that may have been previously gathered by any number and/or types of monitoring devices such as the electronic computing device 110 and/or the instrument modules 135a, 135b, 135c, 135d as a consolidated output that may be graphically illustrated as a plurality of peaks and curves over a predetermined period of time. Further, the data output 402 may be compared with one or more of the thresholds for various alarms as discussed herein. For instance, the plurality of predetermined thresholds for various alarms may include a pre-alarm level 404, an alarm level 406, and a trip-alarm level 408. As discussed above, the pre-alarm level 404 may be set to indicate a predictive failure of a component of the sensed components (e.g., potential machine failure or potential for a machine failure), the alarm level 406 may be when there is an impending failure of the component of the sensed components (e.g., impending machine failure), and the trip-alarm level 408 may be when there is an actual failure of the component of the sensed components (e.g., machine failure). The plurality of predetermined thresholds for various alarms may be stored in the electronic computing device 110, the instrument modules 135a, 135b, 135c, 135d, and/or the like, and may be customizable.

Referring back to FIGS. 1-3, at block 310, the illustrative operating conditions validating system 100 determines whether there is a deviation in the operating conditions of any of the machines of the saltwater disposal pump system 120 that is currently monitored (e.g., the saltwater disposal pump assemblies 125a, 125b, 125c, 125d). The deviation may be determined when an abnormally in the operating conditions triggers any of the predetermined alarms or a deviation level. If a deviation is determined that does not trigger the predetermined alarm or deviation level and/or there is not a deviation in the operating conditions (e.g., normal operating conditions), then the process 300 returns to block 305 to monitor the current operating conditions. As such, the process 300 loops between block 305 and block 310 until the determined deviation triggers one of the predetermined alarms or deviation level (e.g., the pre-alarm level 404, the alarm level 406, and/or the trip-alarm level 408 of FIG. 4). As such, once the determined deviation triggers the predetermined alarm or deviation level, at block 310, then the electronic computing device 110 and/or the instrument modules 135a, 135b, 135c, 135d of the abnormal condition machine (e.g., any one or more of the saltwater disposal pump assemblies 125a, 125b, 125c, 125d) generate an alert to the abnormal operating conditions validation unit 115, at block 315.

As graphically illustrated in FIG. 4, a peak 410 is schematically illustrated as causing an alarm by triggering the alarm level 406, a peak 412 is schematically illustrated as causing an alarm by triggering the pre-alarm level 404, and a peak 414 is schematically illustrated as causing an alarm by triggering the trip-alarm level 408.

Referring back to FIGS. 1-3, the abnormal operating conditions validation unit 115 receives the data associated with the alarm and, at block 320, gathers a plurality of data in real time from the one of the plurality of sensors 130a, 130b, 130c, 130d that corresponds to the machine with the abnormal operating conditions (e.g., one data corresponding to the operating conditions of or more of the saltwater disposal pump assemblies 125a, 125b, 125c, 125d). In a non-limiting example, the plurality of data gathered, for the reasons discussed above, from the corresponding one of the plurality of sensors 130a, 130b, 130c, 130d from the machine with the abnormal operating conditions include the suction strainer differential pressure, the suction flow, the discharge pressure, the suction pressure, the vibrations, and the temperature. At block 325, the abnormal operating conditions validation unit 115 performs the regression analysis using machine learning, algorithms, and/or the like to derive an expected value as an output, at block 330. The regression analysis utilizes a regression formula that includes specific constants that are predetermined based on modeling of a plurality of factors that determine actual performance and predictions of failure, and these constants are used in the formula in combination with the current operating values for the plurality of predetermined real-time data from received or gathered from the corresponding sensor of the plurality of sensors 130a, 130b, 130c, 130d from the machine that is having abnormal operating conditions as the variables to calculated the expected value from the machine with the abnormal operating conditions. As such, while each machine may have thousands of metrics, the formula focuses on the most correlated operating metrics for the advantages over conventional system, as discussed above.

At block 335, the expected value is compared to a plurality of historical expected values and/or historical operating variables for this particular machine. The plurality of historical expected values and/or operating variables for this particular machine may define a predefined operating profile for this particular machine or the predefined operating profile may be set in advance when the machine is known to be operating normally. The comparison of the expected value with the historical expected values and/or historical operating variables is to determine whether the expected value correlates with or deviates from the historical expected values and/or historical operating variables. A determination of a deviation is indicative that the data is not indicative of a machine failure, but instead is indicative of an instrument failure. A correlation determination is indicative that the alarm received from the instrument module of the target machine or the machine that generated the alert (e.g., at least one of the saltwater disposal pump assemblies 125a, 125b, 125c, 125d) or the electronic computing device 110 indicative of the abnormal machine operation is validated.

Still referring to FIG. 3 and now to FIG. 5, the graphical representation 500 schematically illustrates the trend of the expected value 502 compared to the data output 402 over the predetermined period of time. As discussed above and graphically illustrated with respect to FIG. 5, the trend of the expected value 502 is compared to the data output 402 of the machine (e.g., the target machine (at least one of the saltwater disposal pump assemblies 125a, 125b, 125c, 125d) that generated the abnormal condition alert to determine whether or not there is a correlation between the two data. If there is a correlation, then it is determined that the data output 402 is validated and thus the data is authentic and the alarm would continue, as discussed in greater detail herein.

At block 340, if there is a deviation between the expected value trend compared to the plurality of historical data of expected values and/or operating variables for this particular machine (e.g., the data output 402), then at block 345, an alarm that would be typically generated the electronic computing device 110 when the alert is generated (e.g., at block 315) is canceled. As graphically depicted in FIG. 5, the trend line behavior for the expected value 502 is different when compared to the trend line behavior for the data output 402. That is, as illustrated with respect to peaks 410, 414, the trend of the expected value 502 plotted after using the regression analysis does not have similar peaks that match or correlate with the peaks 410, 414 of the data output 402. Such differences indicate there is instrument malfunction and not an actual equipment failure of this particular machine (e.g., the saltwater disposal pump assembly 125a). As such, a false alarm dispatching the technician is avoided. When the peaks 410, 414, and the trend of the expected value 502 have similar peaks that match or correlate with one other, the data is validated and the alarm is authentic.

As such, when there is not deviation (e.g., the data correlates) in the trend line behavior between the expected value 502 compared the plurality of historical expected values and/or operating variables for this particular machine (e.g., data output 402), then, at block 350, a determination is made whether the now validated data exceeds a minimum deviation threshold level or is outside of a minimum deviation range. If the deviation of the data from the normal operating conditions for this particular machine does not exceed the minimum deviation threshold level or is not outside of then minimum deviation range, then at block 345, the alarm that would be typically generated the electronic computing device 110 when the alert is generated (e.g., at block 315) is canceled or held.

In response to a determination that the deviation exceeds the minimum deviation threshold level or is outside of the minimum deviation range, at block 355, a determination is made, regarding whether the deviation data from normal operating conditions for this particular machine (e.g., the target machine that initiated the alarm for the abnormal operating condition) exceeds a second deviation threshold level or is outside of a second deviation range. The second deviation range is a greater, or more strict range than the minimum deviation threshold level, which is indicative of a greater deviation from normal or expected operating conditions of the machine (e.g., the target machine that initiated the alarm for the abnormal operating condition). In response to a determination that the deviation data from normal operating conditions for this particular machine (e.g., the target machine that initiated the alarm for the abnormal operating condition) does not exceed the second deviation threshold level or is not outside of the second deviation range, at block 360, a pre-alarm alert notification is pushed to the technician, requiring the technician to perform some action. As such, the second deviation threshold level or the second deviation range may be at the beginning of equipment failure or used as predictive maintenance. The pre-alarm alert notification may also be pushed to be displayed on GUIs displayed on the electronic computing device 110, as discussed herein.

In response to a determination that the deviation exceeds both the minimum deviation threshold level or is outside of the minimum deviation range, a determination is made, at block 350, and the second deviation threshold level or is outside of the second minimum deviation range, at block 355, a determination is made whether the deviation data from normal operating conditions for this particular machine (e.g., the target machine that initiated the alarm for the abnormal operating condition) exceeds a third deviation threshold level or is outside of a third minimum deviation range, at block 365. The third deviation threshold level or the third minimum deviation range are greater, or stricter than the second deviation threshold level and the second deviation range. In response to a determination that the deviation data from normal operating conditions for this particular machine (e.g., the target machine that initiated the alarm for the abnormal operating condition) does not exceed the third deviation threshold level or is not outside of the third minimum deviation range, then an alarm-level alert notification is pushed to the technician, at block 370, requiring the technician to perform some action. As such, the third deviation threshold level or the third deviation range may be more serious of an equipment failure compared to the predictive maintenance, but is pre-failure. The alarm-level alert notification may also be pushed to be displayed on GUIs displayed on the electronic computing device 110.

In response to a determination that the deviation exceeds the second deviation threshold level or is outside of the second deviation range, at block 365, a trip alert notification is output to the technician, at block 375, and the notification alert may also be pushed to be displayed on GUIs displayed on the electronic computing device 110. Further, at block 380, a shutoff command or instruction is automatically sent to the electronic computing device 110, the instrument modules 135a, 135b, 135c, 135d, respectively, of the abnormal operating machine (e.g., the target machine that initiated the alarm for the abnormal operating condition), and/or the like, to automatically shut off or inhibit further operation of the abnormal operating machine (e.g., the target machine that initiated the alarm for the abnormal operating condition), and, at block 385, a switchover command or instruction is automatically sent to the electronic computing device 110, the instrument modules 135a, 135b, 135c, 135d, respectively and/or the like, of the another machine in the saltwater disposal pump system 120 to automatically switch machine operations to a different, normally operating machine (e.g., transfer the operations from the validated abnormal machine to at least one other machine of the machine in the saltwater disposal pump system 120). As such, the switchover command may bring a different machine online and/or may reassign the workload between a plurality of currently operating machines, based on optimization standards, efficiency, and the like. The trip-alarm level 408 may be when there is an equipment failure and/or an imminent equipment failure.

It should be understood that the process 300 described herein may be simultaneously evaluating machine operating conditions and validating data received. Further, the process 300 may continuous and iteratively run. As such, the illustrative process 300 and the illustrative operating conditions validating system 100 as described herein validate, without human intervention, that the abnormal operating conditions or anomalies are in fact actually occurring, automatically dispatches the technician to respond and may require the technician to acknowledge the alert, and, to prevent further damage to the machine, automatically shutting off the machine while automatically transferring the workload to other machines of the saltwater disposal pump system 120.

Figure 6:
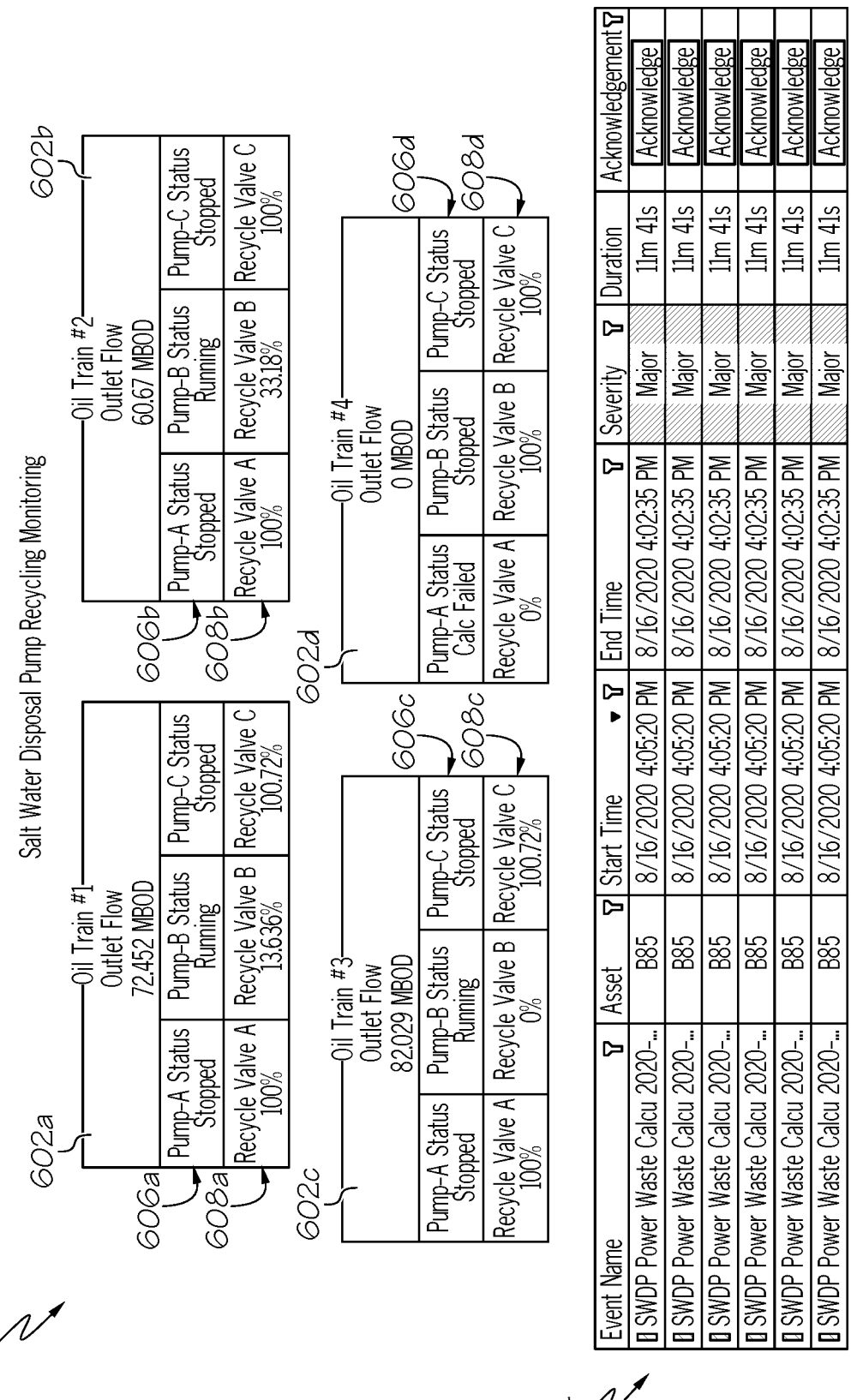
FIG. 6 schematically depicts an illustrative graphical user interface dashboard for monitoring an example machine system that includes a plurality of salt water pumps that may be displayed, according to one or more embodiments shown and described herein.

Now referring to FIGS. 6-10, graphical user interface dashboards that may be displayed on the various monitoring devices, such as the electronic computing device 110 is schematically depicted. FIG. 6 includes a graphical user interface dashboard 600 for a plurality of data, for example and without limitation, live streaming of data related to each of the saltwater disposal pump assemblies 125a, 125b, 125c, 125d in the saltwater disposal pump system 120, is schematically depicted. As illustrated, the graphical user interface dashboard 600 provides data related to various oil trains 602a, 602b, 602c, 602d and current operating status thereof, and an event tracker 604. As illustrated, and without limitation, the current operating statuses of the various oil trains 602a, 602b, 602c, 602d may include additional data related to pump statuses 606a, 606b, 606c, 606d (e.g., data related to the compressors or pumps 190a, 190b, 190c, 190d of the saltwater disposal pump assemblies 125a, 125b, 125c, 125d) and recycle valves 608a, 608b, 608c, 608d (recycle valve assemblies 195a, 195b, 195c, 195d), respectively. As illustrated, there are four machines in the graphical user interface dashboard. As such, the saltwater disposal pump system 120 includes four different saltwater disposal pump assemblies that include the same structure as discussed with respect to the saltwater disposal pump assemblies 125a, 125b, 125c. 125d herein. Further, as illustrated, the various pumps (e.g., the compressors or pumps 190a, 190b, 190c, 190d of the saltwater disposal pump assemblies 125a, 125b, 125c, 125d) may be at different statuses and the various recycle valves are at different stages and percentages. As such, the monitoring all each of the oil trains 602a, 602b, 602c, 602d and the current operating statuses thereof (e.g., outlet water flow in relation to number of running pumps taking in consideration the pump maximum capacity) may be used for optimization purposes and other visual indicators. The event tracker 604 provides several events ranging from pre-alarm to fail, as illustrated as a "Major" severity in the event tracker 604.

Figure 7:
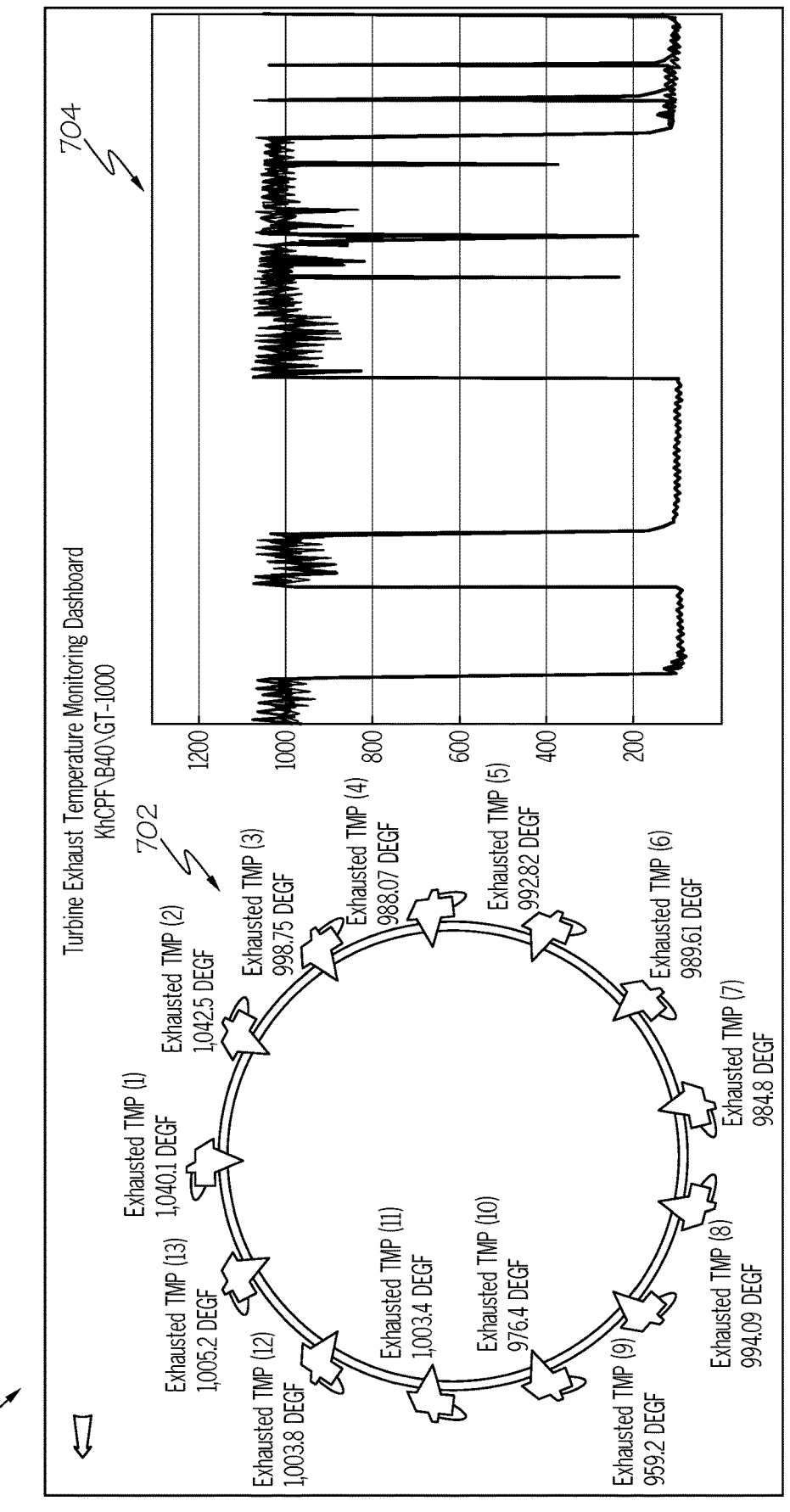
FIG. 7 schematically depicts an illustrative graphical user interface dashboard for turbine exhaust temperature monitoring that may be displayed, according to one or more embodiments shown and described herein.

Referring to FIG. 7, a graphical user interface dashboard 700 for a plurality of data, for example and without limitation, live streaming of data related to turbine exhaust temperature monitoring is schematically depicted. The graphical user interface dashboard 700 provides data related to a simulated live display where the machine process, vibration and temperature data may be easily reviewed for machine healthiness and reliability. As illustrated in FIG. 7, the graphical user interface dashboard 700 provides various exhaust temps 702 at different stages and associated graphical representation 704 of those monitored exhaust temperatures. As such, the dashboard depicted in graphical user interface dashboard 700 monitors and illustrates the gas turbine exhaust temperature emissions and sends, as discussed above, automatic notifications whenever any of those temperatures goes above a predetermined normal boundary for the validation to then occur, as discussed in greater detail herein. Further, dashboard graphically provides the trend for all temperatures to see the behavior over the time.

Figure 8:
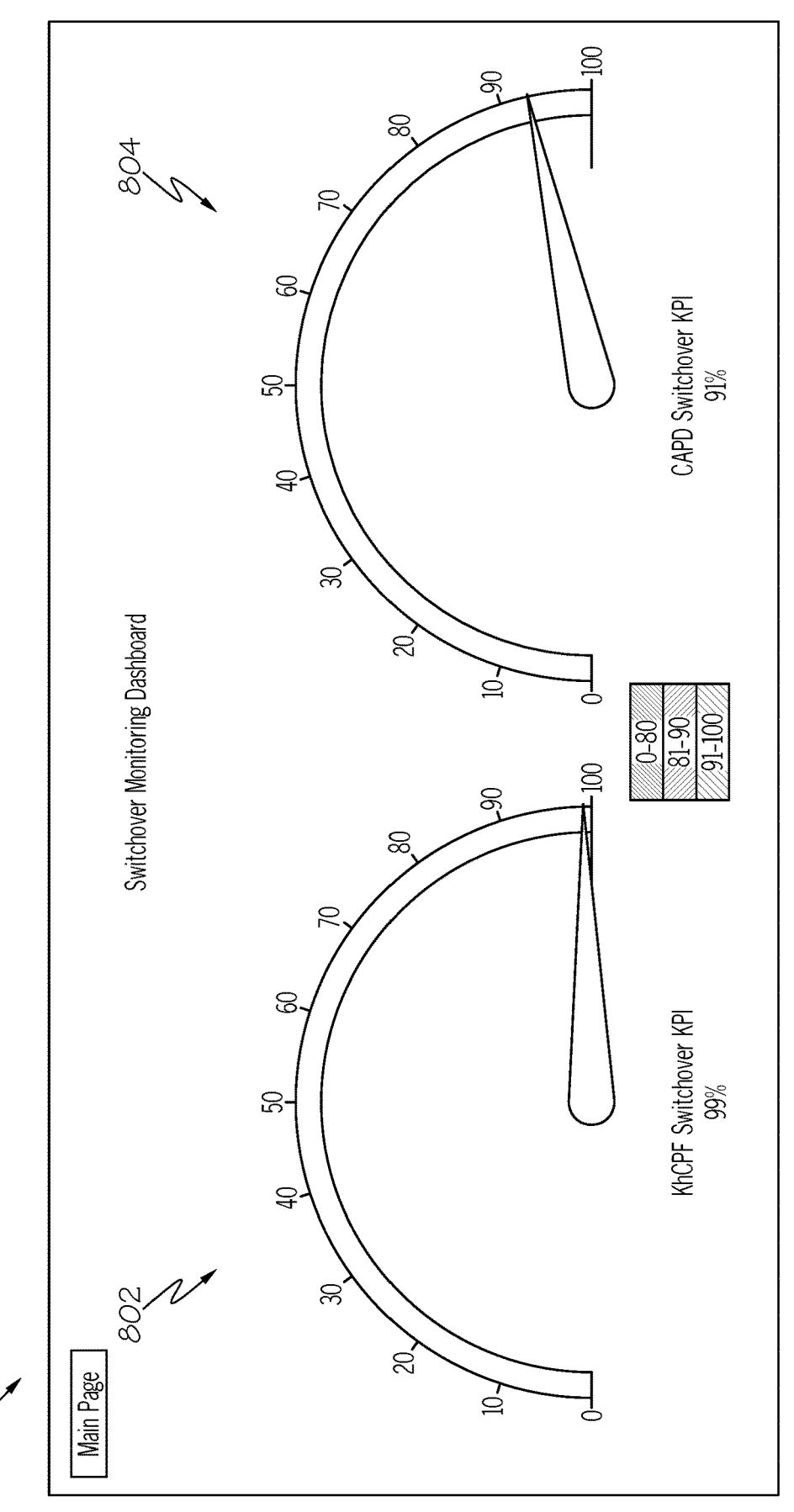
FIG. 8 schematically depicts an illustrative graphical user interface dashboard for machine switchover monitoring, according to one or more embodiments shown and described herein.

Referring to FIG. 8, a graphical user interface dashboard 800 that includes for a plurality of switchover data, for example and without limitation, live streaming of switchover data between two machines (e.g., between the saltwater disposal pump assembly 125a and the remaining plurality of saltwater disposal pump assemblies 125b, 125c, 125d of the saltwater disposal pump system 120 of FIG. 1A) is schematically depicted. The graphical user interface dashboard 800 provides data related to current operating conditions for one machine 802 and a different machine 804 (e.g., at least two of the plurality of saltwater disposal pump assemblies 125a, 125b, 125c, 125d respectively depicted in FIG. 1A). As illustrated, the current operating conditions for the one machine 802 (e.g., the saltwater disposal pump assembly 125b) is nearly 100% while the other different machine 804 (e.g., the saltwater disposal pump assembly 125a) is lowering and currently depicted at 91% on its way to even less or shutdown.

Referring to FIG. 9, a graphical user interface dashboard 900 that includes an event status related to the plurality of switchover data for oil train 602a (FIG. 6) is schematically depicted. The graphical user interface dashboard 900 provides data related to current operating conditions of the machines within the saltwater disposal pump system 120 (e.g., the saltwater disposal pump assemblies 125a, 125b, 125c, 125d herein depicted in FIG. 1A). As illustrated, the current operating conditions for the machines (e.g., depicted as the saltwater disposal pump assemblies 125a) includes whether a machine ID 902, an availability of the machine 904 (e.g., whether the previous machine status is abnormal or normal), a current status of the machine 906 (e.g., whether the machine is running), a switchover frequency 908 (e.g., a predetermined duration of days to automatically switched over operating status so that every machine in the saltwater disposal pump system 120 is ran or operated at predetermined intervals), a last startup time 910, an idle time 912 (e.g., time machine went idle or duration of machine sitting idle), and a switchover compliance 914 (e.g., whether the machine performed the switchover as expected).

Referring to FIG. 10, the event tracker 604 from FIG. 6 depicted for the saltwater disposal pump assembly 125a is schematically depicted. As illustrated, the event tracker 604 provides several events to track by the events name 1002, the machine ID 902, the asset path for the software tracking 1004, the start time of the event 1006, the end time of the event 1008, a severity of the event 1010, the duration on time 1012, and whether the dispatched technician has acknowledged the alarm 1014. The severity of the event 1010 ranges between three alarm levels, as discussed herein. For example, illustrated is a "Warning" indicia that corresponds to the pre-alarm alert, an "Alarm" indicia that corresponds to the alarm-level alert, and a "Major" indicia that corresponds to the trip-level alert, as discussed in greater detail herein. In some embodiments, each of the severity of the event 1010 are color coded. Further, in some embodiments, each of the acknowledged the alarm 1014 may also be color coded based on whether the technician has acknowledge the event once the validation has been completed and the alarm is automatically generated to the technician.

It should now be understood that the embodiments described herein are directed to improved systems and methods to monitor and identify when rotating equipment or machines needs maintenance and thus should not be operating. More specifically, the disclosed systems and methods provide an approach to monitor actual conditions of the rotating equipment or machines to validate an alert of an abnormal operating condition generated by an instrument module communicatively coupled to the rotating equipment or machine or generated from an electronic computing device. The validation is performed by deriving an expected value for a plurality of data provided from a plurality of sensors by utilizing a statistical regression analysis. The statistical regression analysis includes at least one statistical regression formula that includes as variables data gathered from the plurality of sensors such as a suction strainer differential pressure, a suction flow, a discharge pressure, a suction pressure, and a temperature. When the alert of the abnormal operating condition generated by the instrument module or generated from an electronic computing device indicative of the current operating conditions of the rotating equipment is validated, an alert is output to notify a user of the deviation and to inhibit further operation of the machine while also performing an automatic switchover from the machine that is determined to have the abnormal machine operation to a different machine that is operating normally.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A saltwater disposal pump system comprising:
  a saltwater disposal pump assembly comprising:
    an inlet valve;
    a saltwater tank fluidly coupled to the inlet valve, the saltwater tank configured to retain a saltwater;
    at least one pipe fluidly coupled to the saltwater tank;
    an outlet valve fluidly coupled to a portion of the at least one pipe;
    a recycle valve assembly fluidly coupled to the at least one pipe;
    a pump having a motor and fluidly coupled to the at least one pipe and the recycle valve assembly, the pump configured to generate a pressure within the at least one pipe such that the saltwater retained in the saltwater tank is forced through the pump and into a well site under pressure;

a plurality of sensors configured to sense a plurality of data, the plurality of data comprises a suction strainer differential pressure, a suction flow, a discharge pressure, a suction pressure, a vibration, and a temperature; and a saltwater disposal pump transmitter configured to output the plurality of data;

an abnormal operating conditions validation unit communicatively coupled to the saltwater disposal pump assembly via an abnormal operating conditions validation unit receiver that is communicatively coupled to the saltwater disposal pump transmitter, the abnormal operating conditions validation unit comprising:

an operational fluid disposal data output translation module;

an operational fluid disposal data processing module; and an operational disposal data memory comprising at least one instruction that, when executed by the operational fluid disposal data processing module, causes the operational fluid disposal data processing module to:

receive an alarm from the saltwater disposal pump assembly that exceeds a predetermined alarm level indicative of an abnormal machine operation;

receive the plurality of data from the plurality of sensors that is indicative of a current operating conditions of the saltwater disposal pump assembly;

derive an expected value for the plurality of data utilizing a statistical regression analysis, wherein the statistical regression analysis comprises at least one statistical regression formula, the at least one statistical regression formula comprises the plurality of data from the suction strainer differential pressure, the suction flow, the discharge pressure, the suction pressure, the vibration, and the temperature as variables for the statistical regression analysis;

determine whether the expected value and a history of the plurality of data correlate at a point where the plurality of data exceeds the predetermined alarm level indicative of the abnormal machine operation;

in response to determining that the expected value and the history of the plurality of data correlate at the point where the plurality of data exceeds the predetermined alarm level indicative of the abnormal machine operation, determine whether a deviation from a predefined operating profile exceeds a predetermined machine data validation threshold value;

in response to determining that the deviation from the predefined operating profile exceeds the predetermined machine data validation threshold value, validate the alarm;

output an alert of the deviation; and inhibit further operation of the saltwater disposal pump assembly.

2. The saltwater disposal pump system of claim 1, further comprising:

a second saltwater disposal pump assembly comprising:

a second inlet valve;

a second saltwater tank fluidly coupled to the inlet valve, the second saltwater tank configured to retain a second saltwater;

at least one second pipe fluidly coupled to the saltwater tank;

a second outlet valve fluidly coupled to a portion of the at least one second pipe;

a second recycle valve assembly fluidly coupled to the at least one second pipe;

a second pump having a motor and fluidly coupled to the at least one second pipe and the second recycle valve assembly, the second pump configured to generate a pressure within the at least one second pipe such that the second saltwater retained in the saltwater tank is forced through the second pump and into the well site under pressure; and a second plurality of sensors configured to sense a second plurality of data, the second plurality of data comprises a suction strainer differential pressure, a suction flow, a discharge pressure, a suction pressure, a vibration, and a temperature of the second saltwater disposal pump assembly.

3. The saltwater disposal pump system of claim 2, wherein the abnormal operating conditions validation unit is further communicatively coupled to the second saltwater disposal pump assembly.

4. The saltwater disposal pump system of claim 3, wherein:

in response to the alarm being validated, the at least one instruction causes the operational fluid disposal data processing module to:

perform an automatic switchover of operations from the saltwater disposal pump assembly that is determined to have the abnormal machine operation to the second saltwater disposal pump assembly.

5. The saltwater disposal pump system of claim 2, wherein the at least one instruction causes the operational fluid disposal data processing module to:

compare the expected value with the history of the plurality of data from the plurality of sensors.

6. The saltwater disposal pump system of claim 2, wherein the alarm is selected from a group consisting of a pre-alarm level indicative of a potential machine failure, an alarm-level alert indicative of an impending machine failure, and a trip-alarm level indicative of a machine failure.

7. The saltwater disposal pump system of claim 2, further comprising:

a graphical user interface dashboard configured to display a current operating status of the current operating conditions of the saltwater disposal pump assembly and the second saltwater disposal pump assembly, and the at least one instruction causes the operational fluid disposal data processing module to display the current operating status of the saltwater disposal pump assembly and the second saltwater disposal pump assembly.

8. The saltwater disposal pump system of claim 7, wherein the graphical user interface dashboard is further configured to display an event tracker of the saltwater disposal pump assembly and the second saltwater disposal pump assembly, the event tracker visually displays a potential machine failure, an alarm-level alert indicative of an impending machine failure, and a trip-alarm level indicative of a machine failure in which the trip-alarm level is prioritized and highlighted.

9. A method for validating abnormal operating conditions of a saltwater disposal pump system, the method comprising the steps of:

receiving an alarm from a saltwater disposal pump assembly that exceeds a predetermined alarm level indicative of an abnormal machine operation, the saltwater disposal pump assembly comprising:

an inlet valve;

a saltwater tank fluidly coupled to the inlet valve, the saltwater tank configured to retain a saltwater;

at least one pipe fluidly coupled to the saltwater tank;

an outlet valve fluidly coupled to a portion of the at least one pipe;

a recycle valve assembly fluidly coupled to the at least one pipe;

a pump having a motor and fluidly coupled to the at least one pipe and the recycle valve assembly, the pump configured to generate a pressure within the at least one pipe such that the saltwater retained in the saltwater tank is forced through the pump and into a well site under pressure; and a plurality of sensors configured to sense a plurality of data, the plurality of data comprises a suction strainer differential pressure, a suction flow, a discharge pressure, a suction pressure, a vibration, and a temperature;

receiving the plurality of data from the plurality of sensors indicative of a current operating conditions of the saltwater disposal pump assembly;

deriving an expected value for the plurality of data utilizing a statistical regression analysis, wherein the statistical regression analysis comprises at least one statistical regression formula, the at least one statistical regression formula comprises the plurality of data from the suction strainer differential pressure, the suction flow, the discharge pressure, the suction pressure, the vibration, and the temperature as variables for the statistical regression analysis;

determining whether the expected value and a history of the plurality of data correlate at a point where the plurality of data exceeds the predetermined alarm level indicative of the abnormal machine operation;

in response to determining that the expected value and the history of the plurality of data correlate at the point where the plurality of data exceeds the predetermined alarm level indicative of the abnormal machine operation, determining whether a deviation from a predefined operating profile exceeds a predetermined machine data validation threshold value;

in response to determining that the deviation from the predefined operating profile exceeds the predetermined machine data validation threshold value, validating the alarm received from the saltwater disposal pump assembly indicative of the abnormal machine operation;

outputting an alert of the deviation; and inhibiting a further operation of the saltwater disposal pump assembly.

10. The method of claim 9, further comprising:

a second saltwater disposal pump assembly comprising:

a second inlet valve;

a second saltwater tank fluidly coupled to the inlet valve, the second saltwater tank configured to retain a second saltwater;

at least one second pipe fluidly coupled to the saltwater tank;

a second outlet valve fluidly coupled to a portion of the at least one second pipe;

a second recycle valve assembly fluidly coupled to the at least one second pipe;

a second pump having a second motor and fluidly coupled to the at least one second pipe and the second recycle valve assembly, the second pump configured to generate a pressure within the at least one second pipe such that the second saltwater retained in the saltwater tank is forced through the second pump and into the well site under pressure; and a second plurality of sensors configured to sense a second plurality of data, the second plurality of data comprises a suction strainer differential pressure, a suction flow, a discharge pressure, a suction pressure, a vibration, and a temperature of the second saltwater disposal pump assembly.

11. The method of claim 10, further comprising the step of:

performing an automatic switchover from operations of the saltwater disposal pump assembly that is determined to have the abnormal machine operation to the second saltwater disposal pump assembly.

12. The method of claim 10, further comprising the step of:

comparing the expected value with the history of the plurality of data from the plurality of sensors.

13. The method of claim 10, wherein the alarm is selected from a group consisting of a pre-alarm level indicative of a potential machine failure, an alarm-level alert indicative of an impending machine failure, and a trip-alarm level indicative of a machine failure.

14. The method of claim 10, further comprising the step of:

displaying a current operating status of the current operating conditions of the saltwater disposal pump assembly and the second saltwater disposal pump assembly via a graphical user interface dashboard.

15. The method of claim 14, wherein the graphical user interface dashboard is further configured to display an event tracker of the saltwater disposal pump assembly and the second saltwater disposal pump assembly, the event tracker visually displays a potential machine failure, an alarm-level alert indicative of an impending machine failure, and a trip-alarm level indicative of a machine failure in which the trip-alarm level is prioritized and highlighted.

16. A saltwater disposal pump system configured to validate an abnormal machine operating condition, the saltwater disposal pump system comprising:

a first saltwater disposal pump assembly comprising:

a first inlet valve;

a first saltwater tank fluidly coupled to the first inlet valve, the first saltwater tank configured to retain a saltwater;

at least one first pipe fluidly coupled to the first saltwater tank;

a first outlet valve fluidly coupled to a portion of the at least one first pipe;

a first recycle valve assembly fluidly coupled to the at least one first pipe;

a first pump having a first motor and fluidly coupled to the at least one first pipe and the first recycle valve assembly, the first pump configured to generate a pressure within the at least one first pipe such that the saltwater retained in the first saltwater tank is forced
through the first pump and into a well site under
pressure; and a first plurality of sensors configured to sense a first
plurality of data, the first plurality of data comprises
a suction strainer differential pressure, a suction flow,
a discharge pressure, a suction pressure, a vibration,
and a temperature;

a second saltwater disposal pump assembly comprising:
a second inlet valve;
a second saltwater tank fluidly coupled to the second
inlet valve, the second saltwater tank configured to
retain a second saltwater;
at least one second pipe fluidly coupled to the second
saltwater tank;
a second outlet valve fluidly coupled to a portion of the
at least one second pipe;
a second recycle valve assembly fluidly coupled to the
at least one second pipe;
a second pump having a second motor and fluidly
coupled to the at least one second pipe and the
second recycle valve assembly, the second pump
configured to generate a pressure within the at least
one second pipe such that the saltwater retained in
the second saltwater tank is forced through the
second pump and into the well site under pressure;
and
a second plurality of sensors configured to sense a
second plurality of data, the second plurality of data
comprises a suction strainer differential pressure, a
suction flow, a discharge pressure, a suction pressure,
a vibration, and a temperature;

a saltwater disposal pump transmitter configured to output
the plurality of data and the second plurality of data;

an abnormal operating conditions validation unit commu-
nicatively coupled to the first saltwater disposal pump
assembly and the second saltwater disposal pump
assembly via an abnormal operating conditions valida-
tion unit receiver that is communicatively coupled to
the saltwater disposal pump transmitter, the abnormal
operating conditions validation unit comprising:
an operational fluid disposal data output translation
module;
an operational fluid disposal data processing module;
and
an operational disposal data memory comprising at
least one instruction that, when executed by the
operational fluid disposal data processing module,
causes the operational fluid disposal data processing
module to:
receive an alarm from the first saltwater disposal
pump assembly that exceeds a predetermined
alarm level indicative of an abnormal machine
operation;
receive the first plurality of data from the first
plurality of sensors indicative of a current oper-
ating conditions of the first saltwater disposal
pump assembly;
derive an expected value for the first plurality of data
utilizing a statistical regression analysis, wherein
the statistical regression analysis comprises at least one statistical regression formula, the at least
one statistical regression formula that comprises
the first plurality of data from the suction strainer
differential pressure, the suction flow, the dis-
charge pressure, the suction pressure, the vibra-
tion, and the temperature as variables for the
statistical regression analysis;
compare the expected value with a history of the first
plurality of data from the first plurality of sensors;
determine whether the expected value and the history
of the first plurality of data correlate at a point
where the first plurality of data exceeds the pre-
determined alarm level indicative of the abnormal
machine operation;
in response to determining that the expected value
and the history of the plurality of data correlate at
the point where the first plurality of data exceeds
the predetermined alarm level indicative of the
abnormal machine operation, determine whether a
deviation from a predefined operating profile
exceeds a predetermined machine data validation
threshold value;
in response to determining that the deviation from
the predefined operating profile exceeds the pre-
determined machine data validation threshold
value, validate the alarm received from the first
saltwater disposal pump assembly;
output an alert of the deviation;
inhibit further operation of the first saltwater disposal
pump assembly; and
perform an automatic switchover from the first salt-
water disposal pump assembly that is determined
to have the abnormal machine operation to the
second saltwater disposal pump assembly.

17. The saltwater disposal pump system of claim 16,
wherein the alarm is selected from a group consisting of a
pre-alarm level indicative of a potential machine failure, an
alarm-level alert indicative of an impending machine failure,
and a trip-alarm level indicative of a machine failure.

18. The saltwater disposal pump system of claim 17,
further comprising:
a graphical user interface dashboard configured to display
a current operating status of the current operating
conditions of the first saltwater disposal pump assem-
bly and the second saltwater disposal pump assembly.

19. The saltwater disposal pump system of claim 18,
wherein the at least one instruction causes the causes the
operational fluid disposal data processing module to display
the current operating status of the first saltwater disposal
pump assembly and the second saltwater disposal pump
assembly.

20. The saltwater disposal pump system of claim 19,
wherein the graphical user interface dashboard is further
configured to display an event tracker of the first saltwater
disposal pump assembly and the second saltwater disposal
pump assembly, the event tracker visually displays the
potential machine failure, an alarm-level alert indicative of
the impending machine failure, and a trip-alarm level indica-
tive of the machine failure in which the trip-alarm level is
prioritized and highlighted.

* * * * *